(12) United States Patent
Van Affelen et al.

(10) Patent No.: US 12,281,853 B2
(45) Date of Patent: Apr. 22, 2025

(54) HEAT TRANSFER DEVICE WITH NESTED LAYERS OF HELICAL FLUID CHANNELS

(71) Applicant: The Boeing Company, Arlington, VA (US)

(72) Inventors: Douglas H. Van Affelen, Huntington Beach, CA (US); Arun Muley, San Pedro, CA (US); Michael F. Stoia, Rancho Santa Margarita, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/601,959

(22) Filed: Mar. 11, 2024

(65) Prior Publication Data

US 2024/0295363 A1 Sep. 5, 2024

Related U.S. Application Data

(63) Continuation of application No. 17/374,860, filed on Jul. 13, 2021, now Pat. No. 11,927,402.

(51) Int. Cl.
*F28D 7/02* (2006.01)
*B64D 33/02* (2006.01)
(Continued)

(52) U.S. Cl.
CPC ............ *F28D 7/022* (2013.01); *B64D 33/02* (2013.01); *F02C 7/141* (2013.01); *F28F 13/12* (2013.01);
(Continued)

(58) Field of Classification Search
CPC ...... F28D 7/022; F28D 7/0008; F28D 7/0033; F28F 1/06; F28F 13/12; F28F 2255/00;
(Continued)

(56) References Cited

U.S. PATENT DOCUMENTS 2,014,919 A * 9/1935 Zellhoefer .............. F28D 7/022
165/175
2,653,014 A * 9/1953 Sniader ................. F25D 31/002
165/169
(Continued)

FOREIGN PATENT DOCUMENTS

| CN | 106403653 A | 2/2017 |
|---|---|---|
| EP | 3800417 A1 | 7/2021 |
| KR | 10-2018-0066022 A | 6/2018 |

OTHER PUBLICATIONS

Xue, Yuan et al., "On the Heat Transfer Enhancement of Plate Fin Heat Exchanger", Energies, 2018, vol. 11, No. 6: 1398, https://doi.org/10.3390/en11061398, 18 pages.
(Continued)

*Primary Examiner* — Craig Kim
(74) *Attorney, Agent, or Firm* — Kolitch Romano Dascenzo Gates LLC

(57) ABSTRACT

Systems, apparatuses, and methods relating to heat transfer devices having nested layers of helical fluid channels. In some examples, a device for transferring heat includes a set of nested tubular walls and a plurality of helical walls intersecting each of the nested tubular walls to form one or more first channel layers nested with one or more second channel layers. Each of the first and second channel layers includes a plurality of helical fluid channels. A first intake and a first outtake are in fluid communication with one another via the plurality of helical fluid channels of each first channel layer, for flow of a first fluid through the device. A second intake and a second outtake are in fluid communication with one another via the plurality of helical fluid channels of each second channel layer, for flow of a second fluid through the device.

21 Claims, 15 Drawing Sheets

(51) Int. Cl.
   *F02C 7/141* (2006.01)
   *F28F 13/12* (2006.01)
   *F28D 21/00* (2006.01)

(52) U.S. Cl.
   CPC .. *B64D 2033/024* (2013.01); *F05D 2220/323* (2013.01); *F05D 2220/76* (2013.01); *F28D 2021/0021* (2013.01)

(58) Field of Classification Search
   CPC .. B64D 37/32; B64D 33/02; B64D 2033/024; F02C 7/22; F02C 7/141
   See application file for complete search history.

(56) References Cited

U.S. PATENT DOCUMENTS

| | | | | |
|---|---|---|---|---|
| 3,323,585 | A * | 6/1967 | Cannon | F28D 7/022 29/890.036 |
| 3,907,028 | A * | 9/1975 | Lawson | F28D 7/022 165/165 |
| 4,168,745 | A * | 9/1979 | Lastinger | F25B 39/04 165/DIG. 414 |
| 4,215,743 | A * | 8/1980 | Margittai | F28D 7/026 165/155 |
| 4,263,878 | A * | 4/1981 | Hurley | F28F 13/02 122/155.2 |
| 4,275,289 | A * | 6/1981 | Lord | H01L 21/67109 422/906 |
| 4,361,749 | A * | 11/1982 | Lord | H01J 37/32431 165/169 |
| 4,451,960 | A * | 6/1984 | Molitor | B21D 53/027 228/183 |
| 4,852,644 | A * | 8/1989 | Schlemenat | F28F 9/02 165/158 |
| 4,893,672 | A * | 1/1990 | Bader | F28F 9/02 165/95 |
| 5,327,740 | A * | 7/1994 | Ogasawara | F28F 1/08 62/93 |
| 5,394,937 | A * | 3/1995 | Nieh | F28F 9/0275 165/164 |
| 5,568,835 | A * | 10/1996 | LaCount | F28D 7/026 165/140 |
| 6,170,568 | B1 * | 1/2001 | Valenzuela | F28F 3/044 165/DIG. 357 |
| 6,347,453 | B1 * | 2/2002 | Mitchell | F25B 9/145 29/890.036 |
| 6,880,623 | B2 * | 4/2005 | Gierlings | F28D 7/103 165/145 |
| 7,025,119 | B2 * | 4/2006 | Ike | F28D 9/04 165/165 |
| 7,766,075 | B2 | 8/2010 | Vetrovec et al. | |
| 9,494,174 | B2 * | 11/2016 | Pastecki | F23K 5/14 |
| 9,719,733 | B2 * | 8/2017 | Yang | F28D 7/0083 |
| 9,976,815 | B1 | 5/2018 | Roper et al. | |
| 10,495,384 | B2 * | 12/2019 | Rock, Jr | F28D 7/022 |
| 10,782,072 | B2 | 9/2020 | Kolb | |
| 10,989,480 | B2 * | 4/2021 | Rock, Jr. | F28F 1/06 |
| 2004/0109788 | A1 * | 6/2004 | Li | C02F 1/02 422/3 |
| 2005/0269067 | A1 * | 12/2005 | Cowans | F28D 1/06 165/157 |
| 2006/0124285 | A1 * | 6/2006 | Kite | F28F 1/06 165/163 |
| 2009/0272850 | A1 * | 11/2009 | Rainous | B64D 15/00 60/39.093 |
| 2013/0071594 | A1 * | 3/2013 | Bikson | F28D 7/024 428/36.9 |
| 2013/0323033 | A1 | 12/2013 | Lutjen et al. | |
| 2014/0251585 | A1 * | 9/2014 | Kusuda | F28D 1/0226 165/164 |
| 2014/0284038 | A1 * | 9/2014 | Vedula | B22F 5/106 165/185 |
| 2014/0318748 | A1 * | 10/2014 | Svensson | C09D 183/04 165/133 |
| 2015/0176912 | A1 * | 6/2015 | Tsuji | F28D 7/04 29/890.03 |
| 2015/0361922 | A1 | 12/2015 | Alvarez et al. | |
| 2016/0216045 | A1 * | 7/2016 | Chan | F28D 7/106 |
| 2016/0230595 | A1 | 8/2016 | Wong et al. | |
| 2016/0305719 | A1 | 10/2016 | Landre | |
| 2017/0030651 | A1 * | 2/2017 | Rock, Jr. | F28F 1/06 |
| 2017/0326494 | A1 | 11/2017 | Gebald et al. | |
| 2018/0328673 | A1 | 11/2018 | Stoia et al. | |
| 2018/0345425 | A1 | 12/2018 | Caimano et al. | |
| 2019/0145348 | A1 * | 5/2019 | Foutch | F28D 9/0043 60/204 |
| 2019/0337043 | A1 | 11/2019 | Kachi et al. | |
| 2019/0339018 | A1 | 11/2019 | Tarapoom et al. | |
| 2019/0360759 | A1 * | 11/2019 | Collins | H01L 23/473 |
| 2020/0064075 | A1 * | 2/2020 | Rock, Jr. | F28F 7/02 |
| 2020/0140094 | A1 | 5/2020 | White | |
| 2020/0217596 | A1 | 7/2020 | Civeira Domínguez et al. | |
| 2020/0309459 | A1 | 10/2020 | Streeter | |
| 2021/0102756 | A1 * | 4/2021 | Becene | F28F 7/02 |
| 2021/0254904 | A1 | 8/2021 | Bhaskar et al. | |
| 2023/0015392 | A1 | 1/2023 | Van Affelen et al. | |

OTHER PUBLICATIONS

European Patent Office, Extended European Search Report regarding European Patent Application No. 22170091.7, dated Sep. 27, 2022, 7 pages.
U.S. Patent and Trademark Office, Non-Final Office Action regarding U.S. Appl. No. 17/179,327, dated Nov. 4, 2022, 14 pages.
U.S. Patent and Trademark Office, Non-Final Office Action regarding U.S. Appl. No. 17/374,860 dated Feb. 14, 2023, 27 pages.
U.S. Patent and Trademark Office, Final Office Action regarding U.S. Appl. No. 17/179,327, dated Apr. 19, 2023, 12 pages.
U.S. Patent and Trademark Office, Final Office Action regarding U.S. Appl. No. 17/374,860 dated Aug. 22, 2023, 9 pages.
U.S. Patent and Trademark Office, Non-Final Office Action regarding U.S. Appl. No. 17/179,327, dated Oct. 11, 2023, 19 pages.
Canadian Intellectual Property Office, Office Action regarding Canadian Patent Application No. 3158413, Feb. 12, 2024, 4 pages.
U.S. Patent and Trademark Office, Final Office Action regarding U.S. Appl. No. 17/179,327, dated Mar. 7, 2024, 14 pages.

* cited by examiner

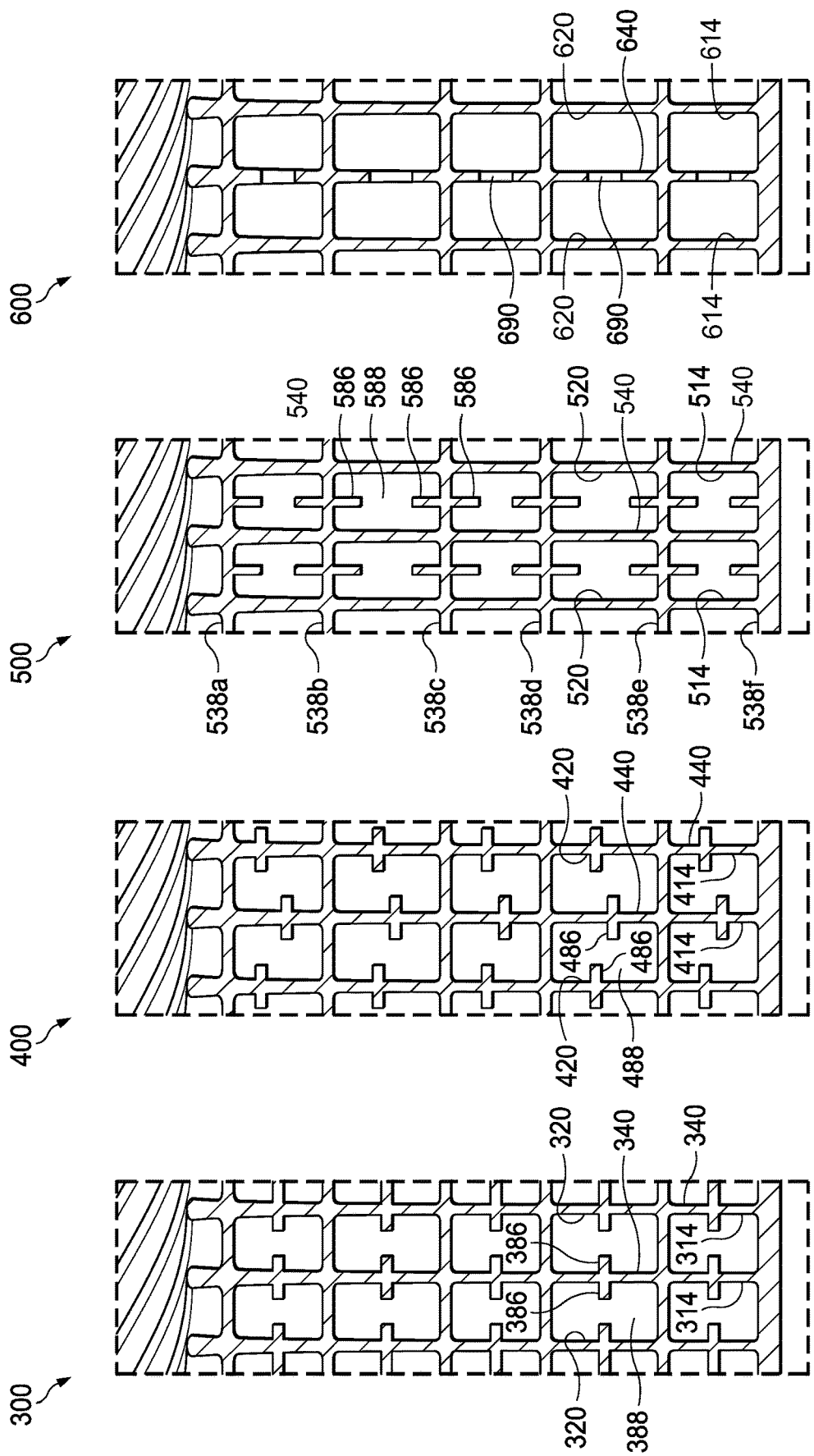

HEAT TRANSFER DEVICE WITH NESTED LAYERS OF HELICAL FLUID CHANNELS

CROSS-REFERENCE TO RELATED APPLICATIONS

This application is a continuation application of U.S. patent application Ser. No. 17/374,860 filed Jul. 13, 2021, which issued Mar. 12, 2024 as U.S. Pat. No. 11,927,402. The complete disclosure of the above-identified patent application is hereby incorporated by reference for all purposes.

BACKGROUND

A heat exchanger is a device for transferring heat between a pair of fluids, often without contact of the fluids with one another. Heat exchangers are used in a wide variety of heating and cooling applications and have three basic configurations for travel of the pair of fluids: parallel flow (in the same direction), cross flow, and counterflow (in opposite directions). Of these configurations, counterflow heat exchangers can transfer heat most efficiently. However, traditional counterflow heat exchangers may be unable to achieve the high efficiency of heat transfer and the compactness needed in demanding applications, such as power generation, that require operation at high temperatures and pressures. Moreover, these traditional heat exchangers can be bulky and heavy due to complex fluid manifolds and thus unsuitable where minimizing size and weight are very important, such as on an aircraft. A new counterflow heat exchanger is needed.

SUMMARY

The present disclosure provides systems, apparatuses, and methods relating to heat transfer devices (heat exchangers) having nested layers of helical fluid channels for directing fluid flow. In some examples, a device for transferring heat between a first fluid and a second fluid includes a set of nested tubular walls and a plurality of helical walls intersecting each of the nested tubular walls to form one or more first channel layers nested with one or more second channel layers. Each of the one or more first channel layers and the one or more second channel layers includes a plurality of helical fluid channels. A first intake and a first outtake are in fluid communication with one another via the plurality of helical fluid channels of each first channel layer, for flow of the first fluid through the device from the first intake to the first outtake. A second intake and a second outtake are in fluid communication with one another via the plurality of helical fluid channels of each second channel layer, for flow of the second fluid through the device from the second intake to the second outtake.

In some examples, an aerospace vehicle (interchangeably called a flight vehicle) includes a vehicle body, an engine connected to the vehicle body and configured to power the vehicle body in a flight mode, and a heat transfer device connected to the vehicle body and/or the engine. The heat transfer device includes a set of nested tubular walls, a plurality of helical walls intersecting each of the nested tubular walls to form one or more first channel layers nested with one or more second channel layers. Each of the one or more first channel layers and the one or more second channel layers includes a plurality of helical fluid channels. A first intake and a first outtake are in fluid communication with one another via the helical fluid channels of each first channel layer, for flow of a first fluid through the heat transfer device from the first intake to the first outtake. A second intake and a second outtake are in fluid communication with one another via the plurality of helical fluid channels of each second channel layer, for flow of a second fluid through the heat transfer device from the second intake to the second outtake.

In some examples, a method of transferring heat between fluids uses a heat transfer device including a set of nested tubular walls intersected by a plurality of helical walls to form one or more first channel layers nested with one or more second channel layers. In the method, a first fluid is passed through the heat transfer device between a first intake and a first outtake via a plurality of helical fluid channels of each first channel layer of the heat transfer device. A second fluid is passed through the heat transfer device between a second intake and a second outtake via a plurality of helical fluid channels of each second channel layer of the heat transfer device.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 15 is a fragmentary sectional view of an illustrative heat transfer device having the same basic structure as the heat transfer device of FIG. 3, viewed generally as in FIG. 11, and showing pairs of aligned protrusions projecting into the lumens of pairs of axially-adjacent helical fluid channels from each helical wall of a plurality of helical walls.

FIG. 16 is a fragmentary sectional view of another illustrative heat transfer device having the same basic structure as the heat transfer device of FIG. 3, viewed generally as in FIG. 11, and showing pairs of protrusions projecting into the lumens of pairs of axially-adjacent helical fluid channels from each helical wall of a plurality of helical walls.

FIG. 17 is a fragmentary sectional view of still another illustrative heat transfer device having the same basic structure as the heat transfer device of FIG. 3, viewed generally as in FIG. 11, and showing protrusions projecting into the lumens of helical fluid channels from a set of nested tubular walls.

FIG. 18 is a fragmentary sectional view of yet another illustrative heat transfer device having the same basic structure as the heat transfer device of FIG. 3, viewed generally as in FIG. 11, and showing openings formed in a helical wall and allowing fluid communication between adjacent helical fluid channels, intermediate the ends thereof, within each channel layer.

DETAILED DESCRIPTION

Figure 1:
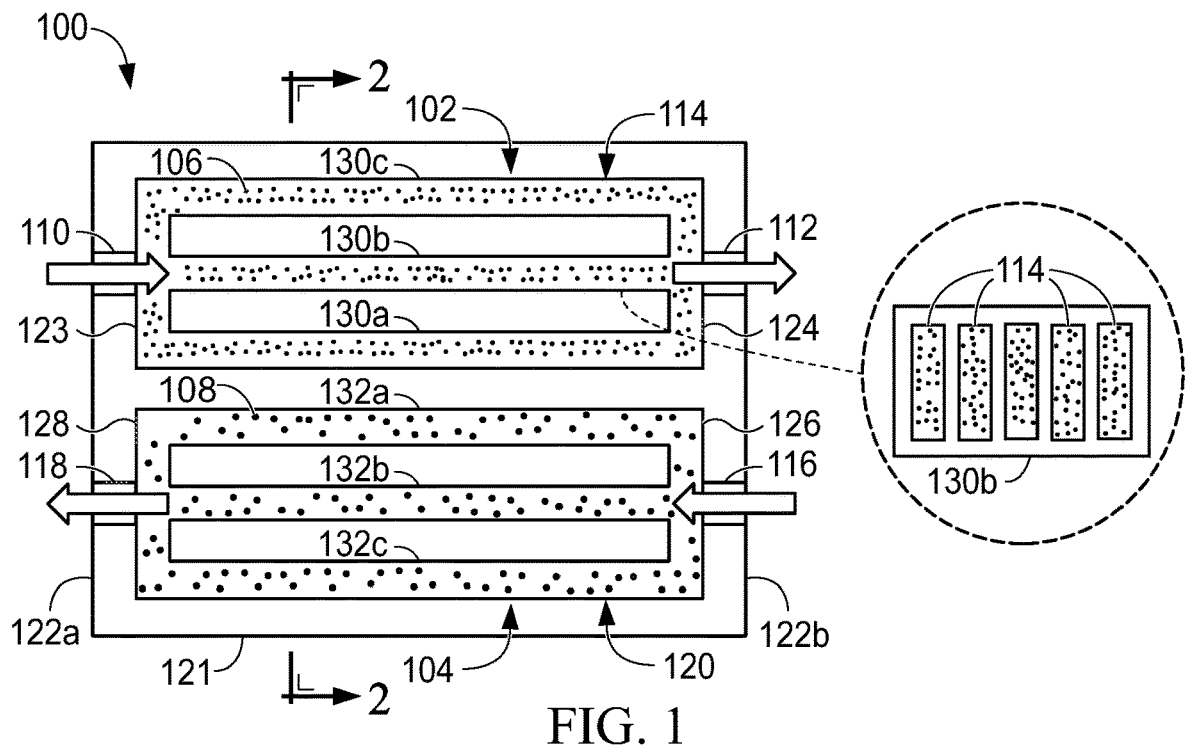
FIG. 1 is a schematic view of an illustrative counterflow heat transfer device having nested layers of helical fluid channels, in accordance with aspects of the present disclosure.

Various aspects and examples of a heat transfer device having nested layers of helical fluid channels, as well as related methods, are described below and illustrated in the associated drawings. Unless otherwise specified, a heat transfer device in accordance with the present teachings, and/or its various components may, but is not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through H, each of which is labeled accordingly.

Overview

In general, a heat transfer device in accordance with the present teachings includes a thermally conductive structure having a first flow path for a first fluid and a second flow path for a second fluid, where the structure is configured to conduct heat between the first fluid and the second fluid. The first and second flow paths may be concentric with, and isolated from, one another. The heat transfer device may be a single additively manufactured unit and may also be referred to as a heat exchanger, a heat sink, and/or a cooler. Although the heat transfer device may be used in any suitable heat transfer application, in some examples, the device may be particularly useful for high temperature/high pressure applications, such as in a thermodynamic cycle to generate power from heat. Accordingly, within examples, the heat transfer device may have particular utility for thermal management in a high speed aircraft (e.g., a hypersonic air vehicle, such as a hypersonic airplane or a missile) or a power plant (e.g., a concentrated solar power plant or nuclear power plant).

The first flow path includes one or more first channel layers and the second flow path includes one or more second channel layers. Each of the first and second channel layers encircles a central axis of the heat transfer device in a spaced relation to the central axis (i.e., without intersecting the central axis). The first and second channel layers may form a nested set of channel layers, may be concentric with one another, and/or may be located radially inward or radially outward of each other first/second channel layer, such as to form an alternating radial series of first and second channel layers. Each first channel layer includes a plurality of first helical fluid channels, and each second channel layer includes a plurality of second helical fluid channels. The first or second helical fluid channels of each first channel layer or each second channel layer are rotationally offset from one another about the central axis. The first flow path and the second flow path are not in fluid communication with one another. More specifically, the first channel layers and first helical fluid channels thereof are not in fluid communication with the second channel layers and second helical fluid channels thereof within the heat transfer device.

The first and second channel layers, and the first and second helical fluid channels thereof, are formed by a set of nested tubular walls intersected by a plurality of helical walls. The nested tubular walls may be concentric with another and each centered on the central axis of the heat transfer device. Each channel layer is located between an adjacent pair of the nested tubular walls or, in some examples, one of the channel layers is located inside the innermost tubular wall of the set of nested tubular walls. The plurality of helical walls may be coaxial with the set of nested tubular walls. Each helical wall spans a space (a gap) between each adjacent pair of the nested tubular walls, and collectively the helical walls divide the space into a plurality of first or second helical fluid channels. Each first helical fluid channel of at least one first channel layer and each second helical fluid channel of at least one second channel layer is bounded by an adjacent pair of the nested tubular walls and by an adjacent pair of the helical walls. Within examples, the use of nested tubular walls intersected by helical walls may allow the heat transfer device to have a larger wetted surface area for more efficient heat transfer, a more robust geometry to withstand large pressure differentials and/or high temperatures, a smaller size, a reduced weight, and/or a reduced pressure drop for fluid flow.

Examples, Components, and Alternatives

The following sections describe selected aspects of exemplary heat transfer devices as well as related systems and/or methods. The examples in these sections are intended for illustration and should not be interpreted as limiting the entire scope of the present disclosure. Terms such as "upper", "lower", "left", and "right" may be used to in the context of the drawings to refer to relative positions of the described components, but it should be understood that any of the described components or heat transfer devices may be used in any orientation. Each section may include one or more distinct examples, and/or contextual or related information, function, and/or structure.

A. Illustrative Counterflow Heat Transfer Device

Figure 2:
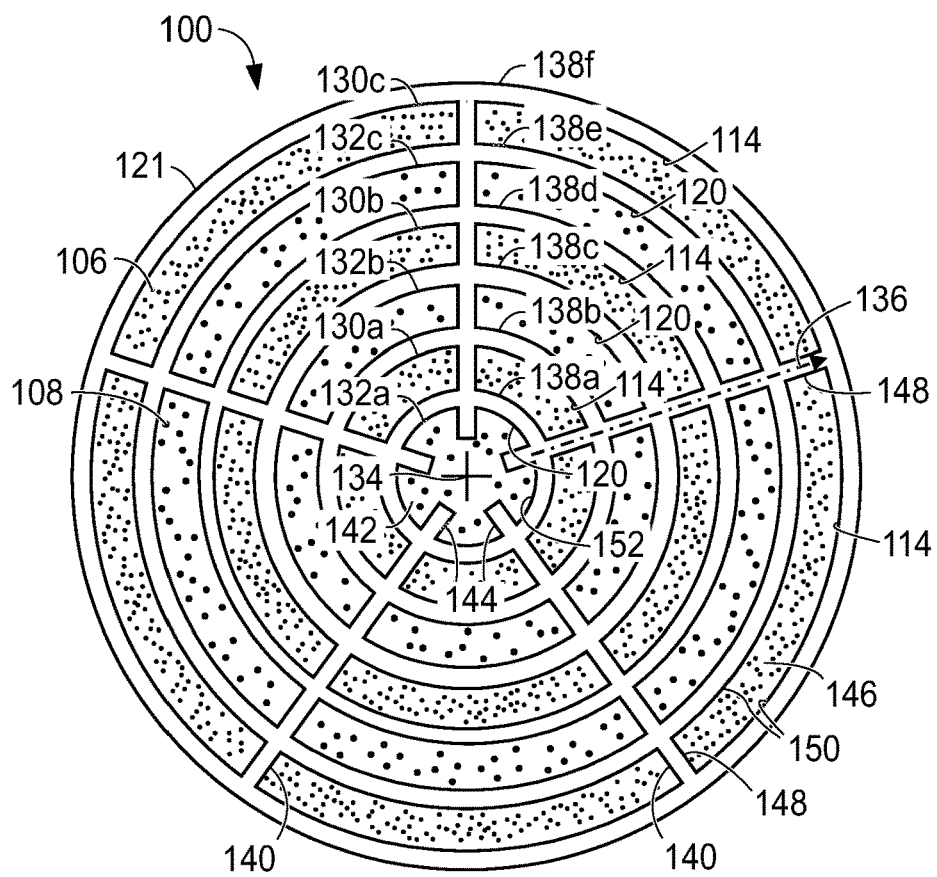
FIG. 2 is another schematic cross-sectional view of the heat transfer device of FIG. 1, taken along line 2-2 of FIG. 1 orthogonal to a central axis of the device.

This subsection describes an illustrative heat transfer device 100 having concentric channel layers of helical fluid channels; see FIGS. 1 and 2.

FIG. 1 shows a schematic diagram of an illustrative heat transfer device 100 (interchangeably called a heat exchanger). The heat transfer device provides a first flow path 102 and a second flow path 104 for flow of a first fluid 106 and a second fluid 108, respectively, through the device without contact of the fluids with one another. In FIGS. 1 and 2, first fluid 106 is represented by smaller dots and second fluid 108 by larger dots.

Each flow path 102, 104 includes an intake, an outtake, and helical fluid channels located along the flow path intermediate the intake and the outtake. (Each intake interchangeably is described as an inlet, and each outtake interchangeably is described as an outlet.) First flow path 102 has a first intake 110 and a first outtake 112 that are in fluid communication with one another via each of a plurality of first helical fluid channels 114. Similarly, second flow path 104 has a second intake 116 and a second outtake 118 that in fluid communication with one another via each of a plurality of second helical fluid channels 120. First helical fluid channels 114 and second helical fluid channels 120 are formed by a central section 121, which is located between a pair of opposite end sections 122a, 122b. Each of the first and second flow paths is described as a helical path because each is composed of helical fluid channels along a majority of its length. The first and second flow paths are concentric (and coaxial) with one another, as determined by the helical portion of each path.

When first fluid 106 and second fluid 108 enter heat transfer device 100 at first and second intakes 110, 116, respectively, the two fluids have different temperatures. For example, first fluid 106 may be hotter than second fluid 108 (or vice versa). Accordingly, first fluid 106 may be described in relative terms as a hot fluid and second fluid 108 as a cold fluid (or vice versa). As the two fluids travel through heat transfer device 100 on first flow path 102 and second flow path 104, heat is transferred from first fluid 106 to second fluid 108, such that first fluid 106 leaves first outtake 112 cooled and second fluid 108 leaves second outtake 118 heated.

First and second flow paths 102, 104 are arranged to permit counterflow of first and second fluids 106, 108 through heat transfer device 100. In other words, the first and second fluids can travel in opposite directions through the heat transfer device on generally parallel paths. As indicated by arrows extending through the first and second intakes 110, 116 and the first and second outtakes 112, 118, first fluid 106 flows from left to right in FIG. 1 through heat transfer device 100 from end section 122a to end section 122b, while second fluid 108 flows from right to left, from end section 122b to end section 122a.

Each flow path 102, 104 also includes a pair of manifolds to connect the intake and outtake of the flow path to the corresponding first or second helical fluid channels. More specifically, first flow path 102 has a first inflow manifold 123 intermediate first intake 110 and first helical fluid channels 114. The first flow path also has a first outflow manifold 124 intermediate first helical fluid channels 114 and first outtake 112. First inflow manifold 123 allows first flow path 102 to branch as it extends from first intake 110 to first helical fluid channels 114, and first outflow manifold 124 allows branches of first flow path 102 to merge as the path extends from first helical fluid channels 114 to first outtake 112. Similarly, second flow path 104 has a second inflow manifold 126 intermediate second intake 116 and second helical fluid channels 120. The second flow path also has a second outflow manifold 128 intermediate second helical fluid channels 120 and second outtake 118. Second inflow manifold 126 allows second flow path 104 to branch as it extends from second intake 116 to second helical fluid channels 120, and second outflow manifold 128 allows branches of second flow path 104 to merge as the path extends from second helical fluid channels 120 to second outtake 118.

The helical fluid channels of each flow path 102, 104 are arranged in multiple channel layers, each including a plurality of helical fluid channels (within examples, at least 3, 4, 5, 6, 8, or 10 helical fluid channels, among others). In heat transfer device 100, a plurality of first helical fluid channels 114 are located in each of first channel layers 130a, 130b, and 130c, and a plurality of second helical fluid channels 120 are located in each of second channel layers 132a, 132b, and 132c. The channel layers are nested and concentric with one another. A portion of first channel layer 130b is magnified on the right side of FIG. 1 to show the presence of five helical fluid channels 114, although within examples, more or fewer helical fluid channels may be present in the channel layer. Within examples, the number of helical fluid channels per channel layer, and the size of each helical fluid channel, may be selected to achieve a desired balance between the efficiency of heat transfer and the pressure drop.

The number of channel layers present in the device may be chosen based on the heat transfer rate and efficiency needed. Increasing the number of channel layers increases the wetted surface area, which can increase the heat transfer rate, the heat transfer efficiency, or both, at the expense of increased size, weight, and/or pressure drop. For practical reasons, there may be at least a minimum spacing, such as at least about one millimeter, between opposite channel walls of the helical fluid channels (e.g., the size of the gap between adjacent tubular walls of the nested tubular walls), to avoid excessive pressure drops. The size of the device also or alternatively may be chosen to meet the performance requirements of a particular application. For example, the device may be enlarged in length and/or diameter to provide a higher heat transfer capacity.

First and second fluids 106, 108 may be supplied to first and second intakes 110, 116 by separate fluid systems, each including a pump or other compressor and a fluid source. The fluids may include, but are not limited to, gases such as nitrogen or atmospheric air, a substance in a supercritical state, such as supercritical carbon dioxide, steam, dielectric liquid coolants such as silicone oils, non-dielectric liquid coolants such as aqueous solutions of ethylene glycol, and/or newer coolants such as nanofluids or ionic liquids, among others. For example, first fluid 106 may be air or steam and second fluid 108 may be supercritical carbon dioxide. In some examples, the cold fluid is a working fluid in a power cycle that converts heat to another form of energy. The first and second fluids are at different temperatures when they enter the heat transfer device, and may have different chemical compositions from one another or the same chemical composition.

FIG. 2 shows a less schematic cross-sectional view of heat transfer device 100 taken through channel layers 130a-130c and 132a-132c of central section 121, orthogonal to a central axis 134 of the device. Channel layers 130a-130c for first fluid 106 are arranged to alternate with channel layers 132a-132c for second fluid 108, in a radial direction 136, that is, along a radius that intersects, and is oriented orthogonal to, central axis 134.

Heat transfer device 100 has a set of nested tubular walls 138a-138f each encircling and centered on central axis 134, and thus concentric with one another. Six nested tubular walls are shown here, but in other examples, the heat transfer device may have any suitable number of nested tubular walls, such as at least three, four, five, or more. The number of nested tubular walls in the set may be determined by the size of the heat transfer device and the rate of heat transfer required, with a larger heat transfer device and/or a higher rate of transfer generally utilizing a greater number of nested tubular walls. The set of nested tubular walls includes an outermost tubular wall 138f, an innermost tubular wall 138a located at least predominantly inside outermost tubular wall 138f, and tubular walls 138b-138e each located between the outermost and innermost tubular walls and at least predominantly inside the outermost tubular wall. In the example depicted, each of the tubular walls is cylindrical and of successively larger diameter when considered in order from innermost to outermost. In other examples, the tubular walls are non-cylindrical, such as having a tubular geometry based on an oval, wavy, or irregular cross-sectional shape. Tubular walls 138a-138f are spaced from one another in radial direction 136. Within examples, the spacing of the tubular walls from one another may be uniform or may vary. Varying the spacing may facilitate adjustment (e.g., equalization) of the wetted surface area of the first channel layers relative to the second channel layers and/or may accommodate the respective viscosities of the first and second fluids (e.g., a larger radial gap between adjacent tubular walls for a more viscous fluid and a smaller radial gap for a less viscous fluid). Within examples, the thickness of tubular walls 138a-138f may be uniform or varying for each tubular wall, and uniform or varying among the tubular walls. A constant thickness for a given tubular wall may be advantageous to avoid points of weakness, and a varying thickness for the tubular wall may be desired to make the tubular wall thicker at positions where stress is expected to be greater, such as at junctions with other walls. A varying thickness among the tubular walls may be advantageous to strengthen the heat transfer device against external/internal pressure differentials. For example, outermost tubular wall 138f may function as a housing/shell for the device, and thus may be thicker than the other tubular walls to protect the heat transfer device from the pressure differential between inside and outside the heat transfer device.

Heat transfer device 100 has a plurality of helical walls 140 each intersecting each nested tubular wall of the set of nested tubular walls 138a-138f, to form first helical fluid channels 114 of first channel layers 130a-130c and second helical fluid channels 120 of second channel layers 132a-132c. In the example depicted, the heat transfer device has five helical walls 140 each intersecting each of nested tubular walls 138a-138f, to form five helical fluid channels 114 or five helical fluid channels 120 in each first or second channel layer. However, within examples, more or fewer helical walls may be present, such as at least two, three, four, five, six, eight, or ten, among others, to form a matching number of helical fluid channels in each channel layer. Helical walls 140 are coaxial with the set of nested tubular walls 138a-138f and thus centered on central axis 134.

Each helical wall 140 of the plurality of helical walls extends radially outward, linearly, in a different radial direction 136, at a given position along central axis 134. The helical wall intersects each of nested tubular walls 138a-138f. Accordingly, the helical wall extends (at least) from innermost tubular wall 138a, which is closest to central axis 134, to outermost tubular wall 138f, which is farthest from central axis 134. In the depicted example, the helical wall also protrudes radially inward from the innermost tubular wall into a lumen 142 thereof, to form a helical rib 144 having a free edge in lumen 142. In other examples, helical ribs 144 join one another at central axis 134. In other examples, helical walls 140 do not protrude into lumen 142.

Helical walls 140 match one another in size and shape. The helical walls have the same helical lead and the same radius as one another. They are rotationally offset from one another about central axis 134, optionally uniformly offset from one another by the same angle of rotation, such that the helical pitch of the helical walls is uniform. A uniform rotational offset among helical walls 140 may be desirable to produce the same size of helical fluid channels within a given channel layer and the same resistance to flow among the helical fluid channels of the channel layer. The term "helical pitch," as used herein, is the distance between adjacent helical walls measured parallel to the central axis at the periphery of the helical walls. The "helical lead," as used herein, is the axial distance spanned by one complete turn of a helical wall, measured parallel to the central axis at the periphery of the helical wall.

Helical walls 140 and nested tubular walls 138a-138f collectively bound helical fluid channels 114, 120. The helical walls 140 divide a space 146 (a gap) between each adjacent pair of tubular walls 138a-138f, and at least a radially outer portion of lumen 142 of innermost tubular wall 138a, into two or more helical fluid channels 114 or two or more helical fluid channels 120. More specifically, each adjacent pair of the helical walls provides a series of pairs of rotationally-offset channel walls 148 each partially bounding one of the helical fluid channels of a helical column of helical fluid channels 114, 120. Similarly, each adjacent pair of nested tubular walls 138a-138f provides a circumferential series of pairs of radially-spaced channel walls 150 each partially bounding one of the helical fluid channels of a circumferential row of helical fluid channels 114 or 120. Helical fluid channels 120 of core channel layer 132a are formed inside innermost tubular wall 138a. These helical fluid channels may be open helical passages 152 that are open along a radially inward side of each channel, and thus in fluid communication with one another along each helical passage, intermediate the ends thereof.

Within examples, helical walls 140 may have three primary functions. First, the helical walls, also called helical fins or heat transfer walls, provide wetted heat transfer surfaces that increase the efficiency of heat transfer. Second, the helical walls conduct heat between adjacent channel layers, which also increases the efficiency of heat transfer. Third, the helical walls may be radially continuous, extending from the outermost tubular wall to the innermost tubular wall, which may create a direct, continuous load path from the exterior wall of the heat transfer device to the innermost tubular wall. This load path allows the helical walls to handle high pressure differentials in tension. Each helical wall may have a uniform thickness, or may decrease in thickness (e.g., may taper or thin stepwise) toward the central axis of the device, to fine-tune strength capability and potentially reduce weight.

Heat transfer device 100 is composed of a thermally conductive material, which may be metallic, polymer, or polymer composite (e.g., carbon fiber reinforced polymer (CFRP)), among others. The heat transfer device may be constructed by additive manufacturing, such as from a powder or filament of the thermally conductive material. If formed of polymer or polymer composite, the device being constructed may be treated by a post-build sealing process to ensure pressure containment (e.g., by epoxy vacuum infiltration). The heat transfer device may include multiple materials, or may be produced from a single material. Thermal conductivity, specific heat, density, and phase transition temperatures, along with other factors, may be considered in selecting a material or combination of materials. Appropriate or desirable materials may depend on an intended application and a selected additive manufacturing method.

Heat transfer device 100 is partially or entirely unitary. In some examples, the nested tubular walls and helical walls are formed collectively as a single monolithic structure. In some examples, the single monolithic structure includes each manifold and/or each intake and outtake. The heat transfer device may be additively manufactured in one process, without need for assembly of separate parts.

Heat transfer device 100 may have improved reliability, as a result of unitary construction. Less than optimal performance of the heat transfer device related to issues with connection or interaction of parts may be eliminated. Part count, production time, and manufacturing costs may be reduced. Unitary construction may also improve heat transfer between fluids 106, 108 by removing joints and interfaces and increasing the wetted surface area of the heat transfer device, and creating flow paths that are difficult or impossible to construct without the benefit of additive manufacturing.

B. Illustrative Counterflow Heat Transfer Device

This subsection describes another illustrative heat transfer device 200 having concentric layers of helical fluid channels; see FIGS. 3-14. The relative terms "hot" and "cold" are used as arbitrary, interchangeable designations in this subsection to distinguish respective structures that contact a pair of fluids of different temperature.

Heat transfer device includes a hot flow path 202 (dashed arrows) for flow of a hot fluid 206 through the device, and a cold flow path 204 (solid arrows) for flow of a cold fluid 208 through the device, where the two paths are completely separate from one another (see FIGS. 8 and 12-14). Both paths are created by a central section 221 and a pair of end sections 222a, 222b, which are formed collectively by additive manufacturing as a single monolithic unit (see FIGS. 3-5 and 9). Central section 221 is cylindrical and each end section 222a, 222b tapers away from central section 221 to a pair of cylindrical ports (an intake and an outtake) of substantially smaller diameter than the central section.

The cylindrical ports are a hot outtake 212 and a cold intake 216 for end section 222a, and a hot intake 210 and a cold outtake 218 for end section 222b (see FIGS. 3-9). (The intakes and outtakes are interchangeably called inlets and outlets, respectively.) Heat transfer device 200 defines a longitudinal axis 234 (see FIGS. 4 and 5). Hot intake 210, hot outtake 212, cold intake 216, and cold outtake 218 define respective axes 254 that are parallel to one another and longitudinal axis 234, and coplanar with one another (see FIG. 4). This axial arrangement of intakes and outtakes avoids sharp turns and thus the pressure drop associated with such sharp turns. The intakes and outtakes may have different sizes and/or features to ensure that these ports are distinguishable from one another for proper connection to fluid sources.

Figure 3:
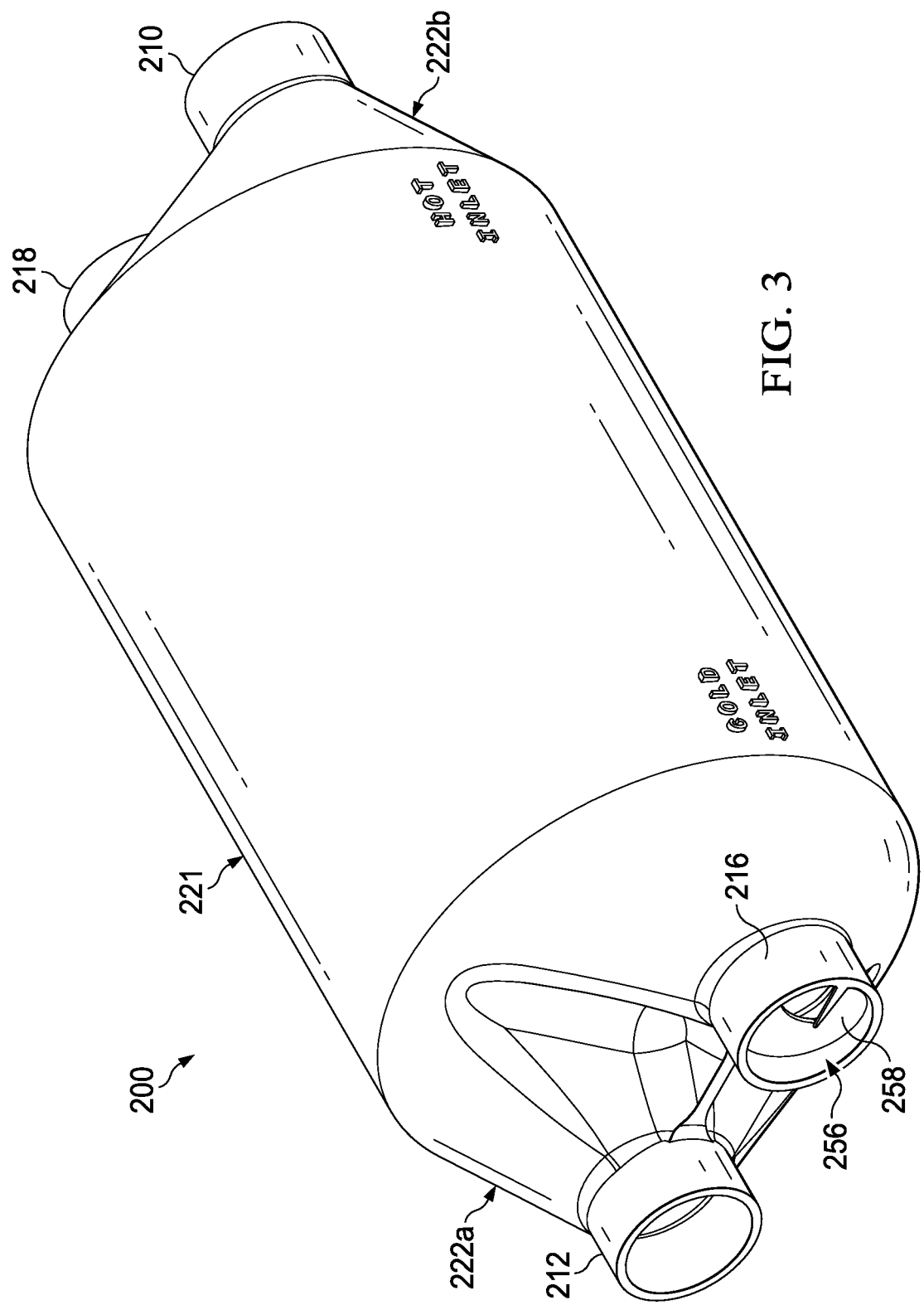
FIG. 3 is an isometric view of another illustrative counterflow heat transfer device having nested layers of helical fluid channels.
Figure 4:
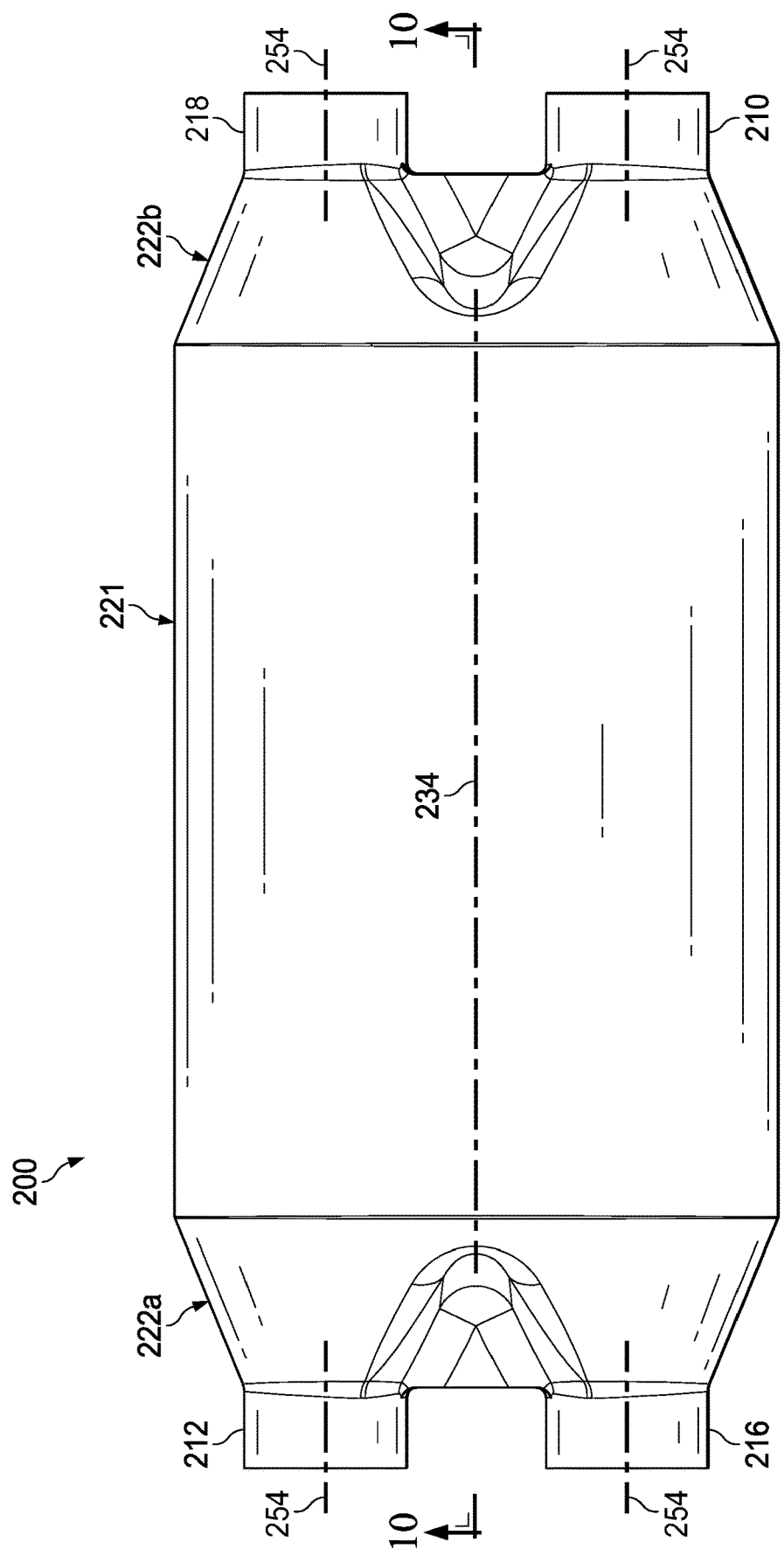
FIG. 4 is a top view of the heat transfer device of FIG. 3.
Figure 5:
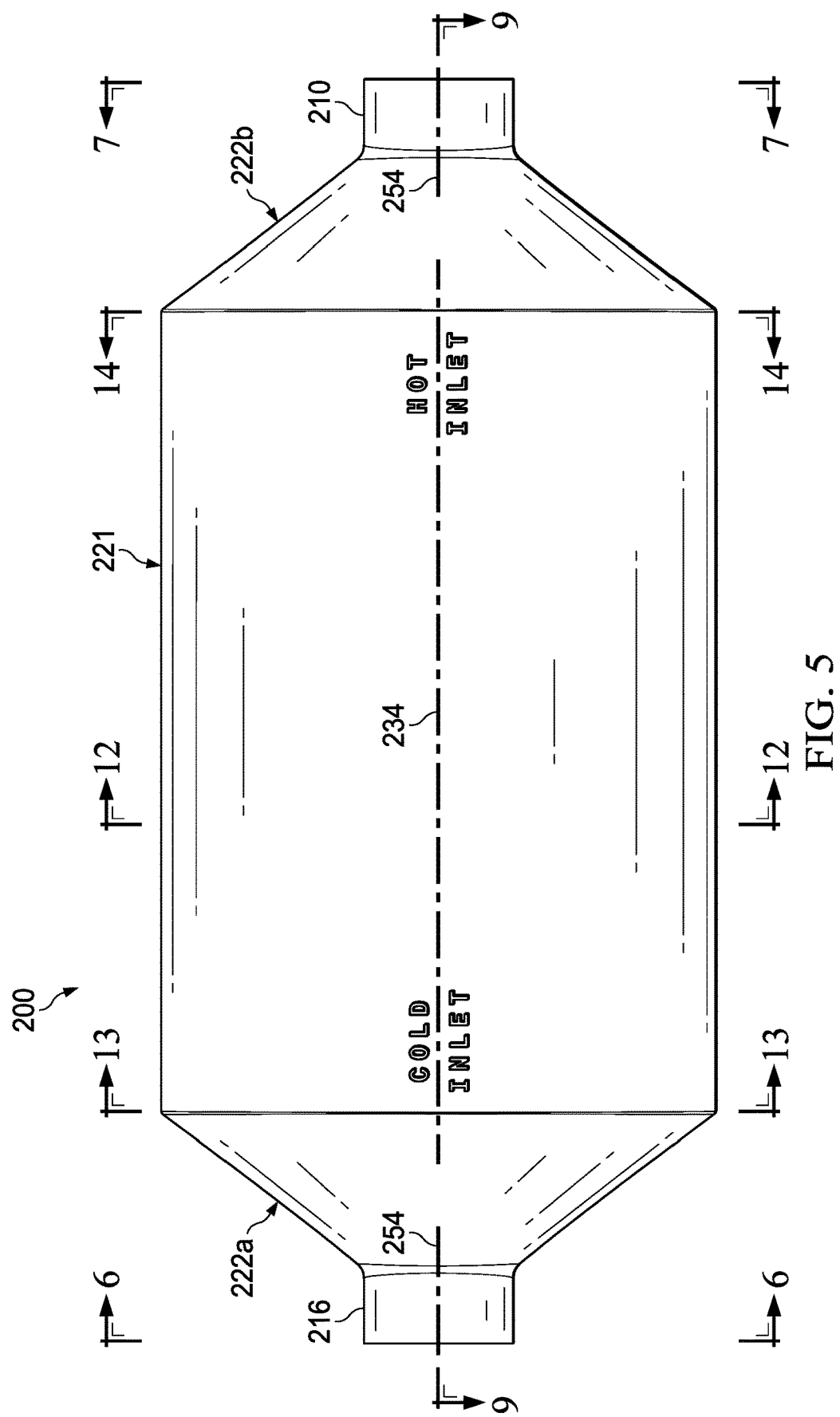
FIG. 5 is a side view of the heat transfer device of FIG. 3.
Figure 6:
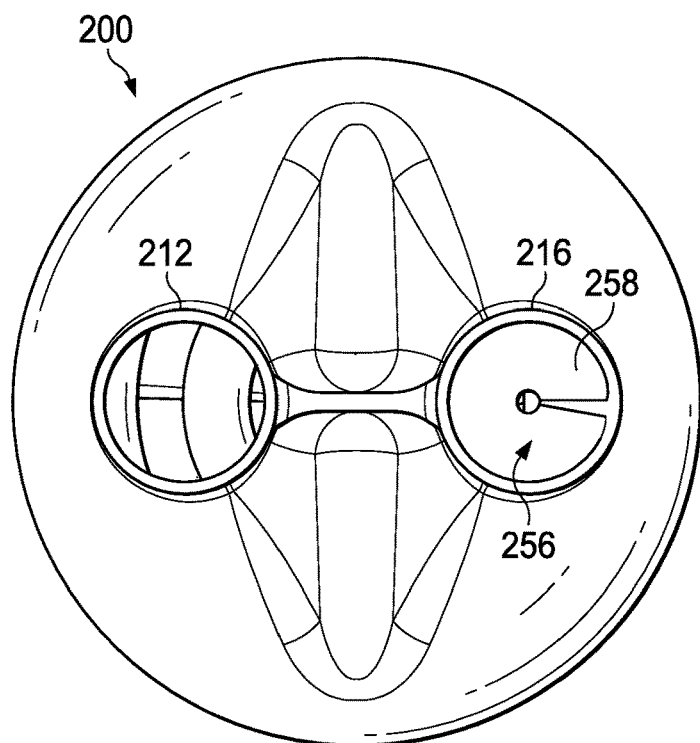
FIG. 6 is an end view of the heat transfer device of FIG. 3, taken along line 6-6 of FIG. 5 and showing a hot outtake and a cold intake of the heat transfer device.
Figure 7:
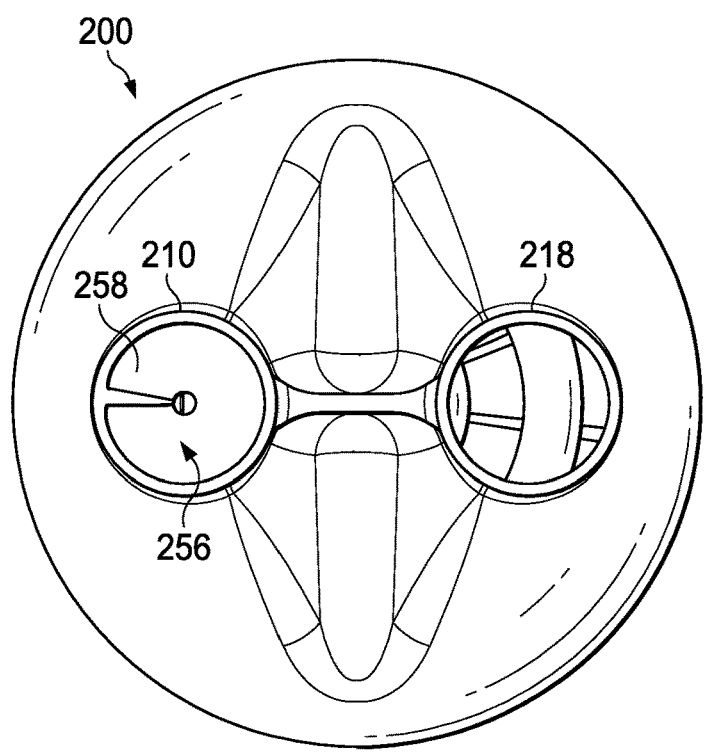
FIG. 7 is an opposite end view of the heat transfer device of FIG. 3, taken along line 7-7 of FIG. 5 and showing a hot intake and a cold outtake of the heat transfer device.
Figure 8:
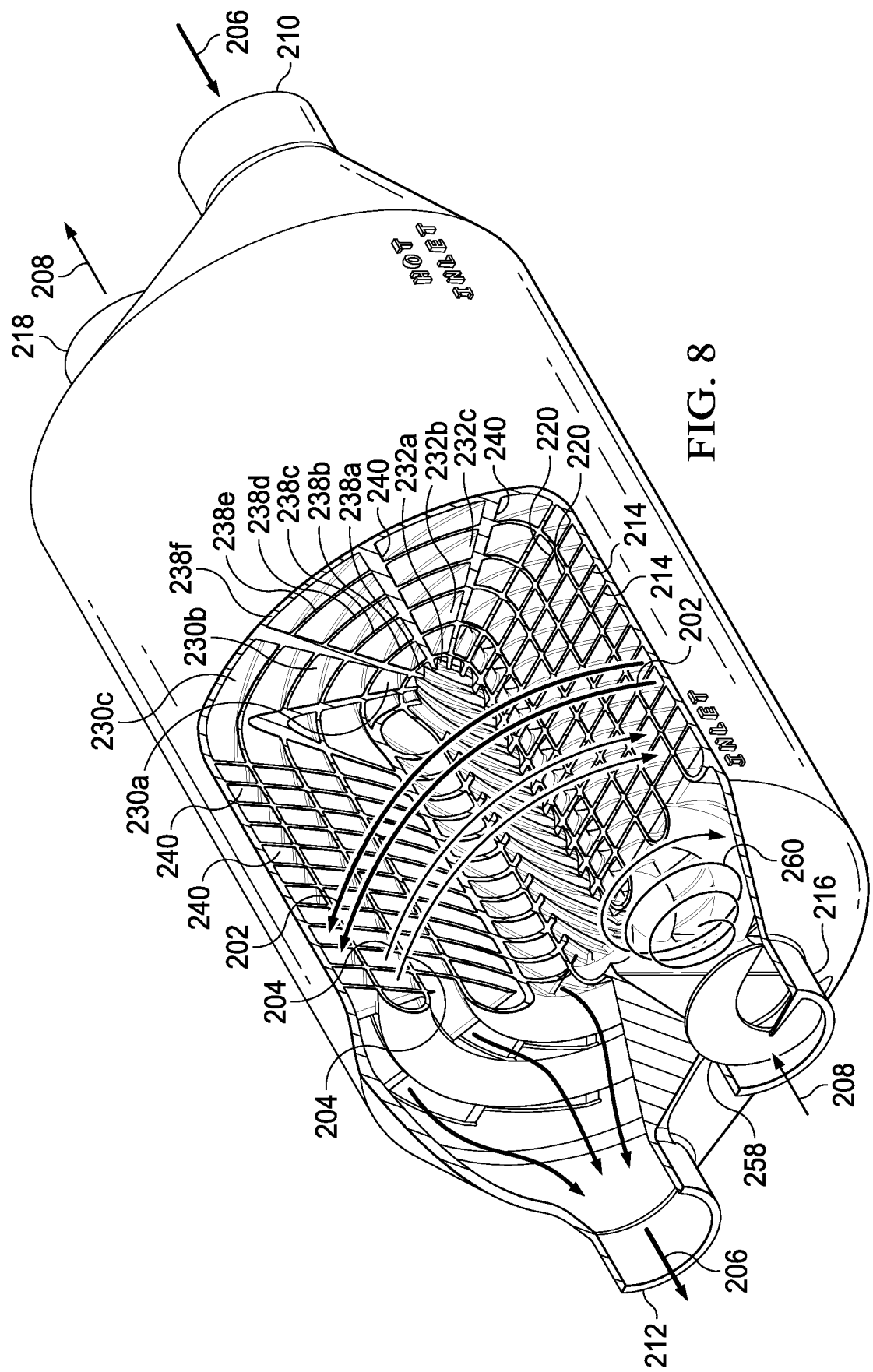
FIG. 8 is a cutaway view of the heat transfer device of FIG. 3, with flow paths for hot and cold fluids indicated using arrows having different line weights.

Hot intake 210 and cold intake 216 each include a swirl initiator 256 (see FIGS. 3, 6, and 7). The swirl initiator includes one or more flow-steering vanes 258 projecting into the lumen of the corresponding intake (see FIGS. 3 and 6-9), and promotes a swirling flow 260 of a hot or cold fluid passing through the intake (see FIG. 8). Each flow-steering vane 258 may be helical. The swirling flow advantageously encourages mixing of each fluid within heat transfer device 200, and thus drives more rapid and efficient heat transfer between the pair of fluids 206, 208 flowing through the device. In addition, the swirling flow provides better alignment of fluid flow with the inlets of the helical fluid channels. This better alignment of fluid flow avoids the need for an abrupt turn in flow direction, which may result in an undesirably large pressure drop and flow maldistribution, when each fluid enters the helical fluid channels.

Figure 9:
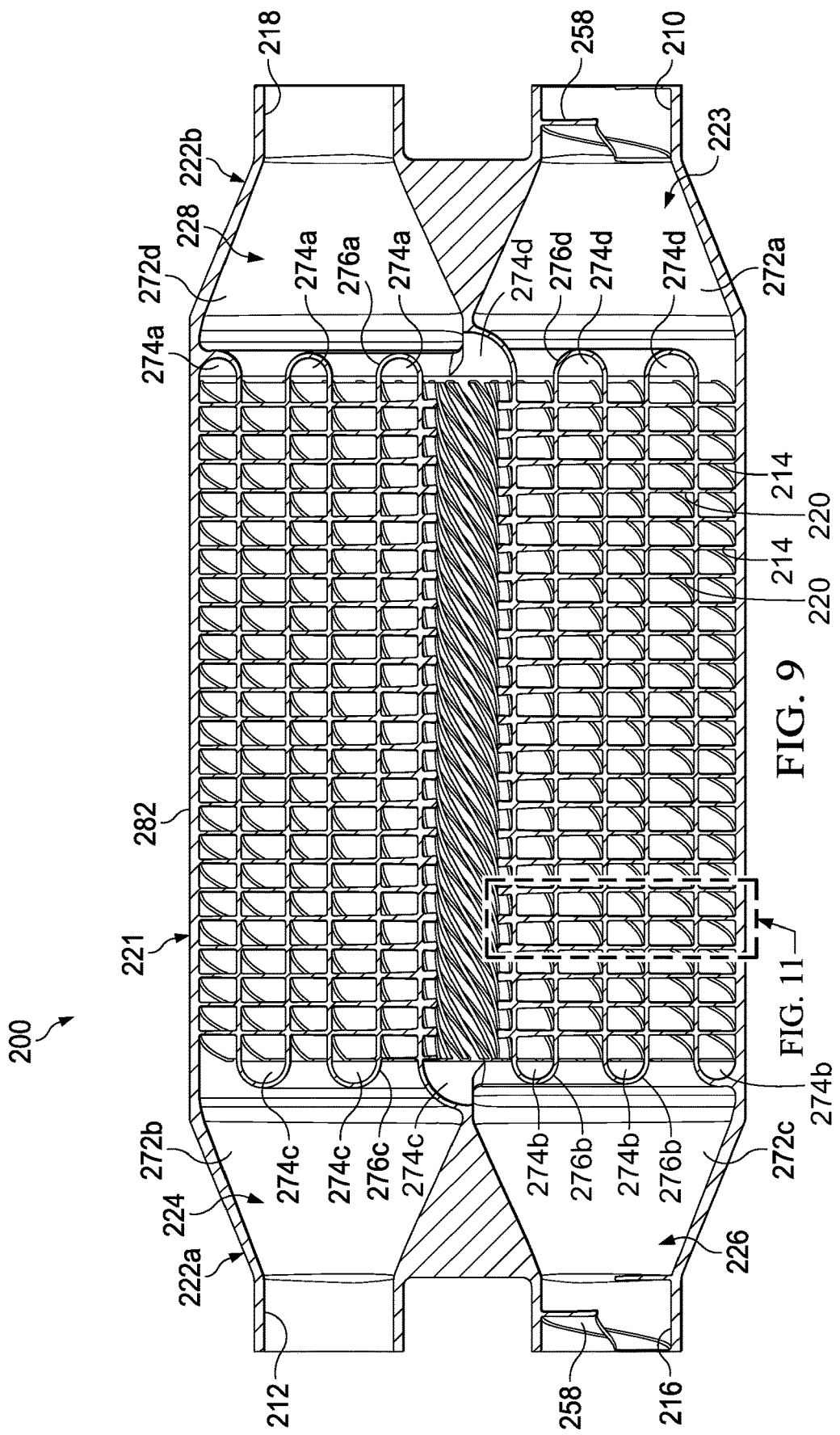
FIG. 9 is a sectional view of the heat transfer device of FIG. 3, taken along line 9-9 of FIG. 5.

FIG. 9 shows a sectional view of heat transfer device 200. Each end section 222a, 222b includes a pair of manifolds each providing fluid communication between a port and hot helical fluid channels 214 or cold helical fluid channels 220 of central section 221. More specifically, end section 222a has a cold inflow manifold 226 that connects cold intake 216 to cold helical fluid channels 220, and also has a hot outflow manifold 224 that connects hot helical fluid channels 214 to hot outtake 212. Similarly, end section 222b has a hot inflow manifold 223 that connects hot intake 210 to hot helical fluid channels 214, and also has a cold outflow manifold 228 that connects cold helical fluid channels 220 to cold outtake 218. The structure of these manifolds is explained in more detail below.

Central section 221 of the depicted example includes six nested tubular walls 238a-238f and twelve helical walls 240 arranged coaxially with one another (see FIGS. 9-12). Within examples, the number of nested tubular walls may be at least three, four, five, six, eight, or ten, among others. Within examples, the number of helical walls may be at least two, three, four, five, six, eight, or ten, among others. In the depicted example, the nested tubular walls are intersected by the helical walls to form six concentric channel layers, namely, three hot channel layers 230a-230c and three cold channel layers 232a-232c arranged alternately. In other words, from innermost to outermost along radial direction 236, the order of channel layers is cold channel layer 232a, hot channel layer 230a, cold channel layer 232b, hot channel layer 230b, cold channel layer 232c, and hot channel layer 230c. Within examples, the heat transfer device may have at least one, two, three, four, five, or more hot channel layers, at least one, two, three, four, five, or more cold channel layers, and at least two, three, four, five, six, eight, or ten channel layers (each hot or cold). Each of the hot channel layers and cold channel layers contains the same number of helical fluid channels. In the depicted example, each hot channel layer 230a-230c contains twelve hot helical fluid channels 214, and each cold channel layer 232a-232c contains twelve cold helical fluid channels 220. Within examples, with any number of helical walls 240, the number of helical fluid channels 214 or 220 in each channel layer may match the number of helical walls 240. In the depicted example, central section 221 has a total of thirty-six hot helical fluid channels 214 and thirty-six cold helical fluid channels 220. Within examples, the heat transfer device may have a total of at least 4, 8, 12, 16, 20, 24, 28, 32, 36, 40, or 50 helical fluid channels (each hot or cold), among others.

Figure 12:
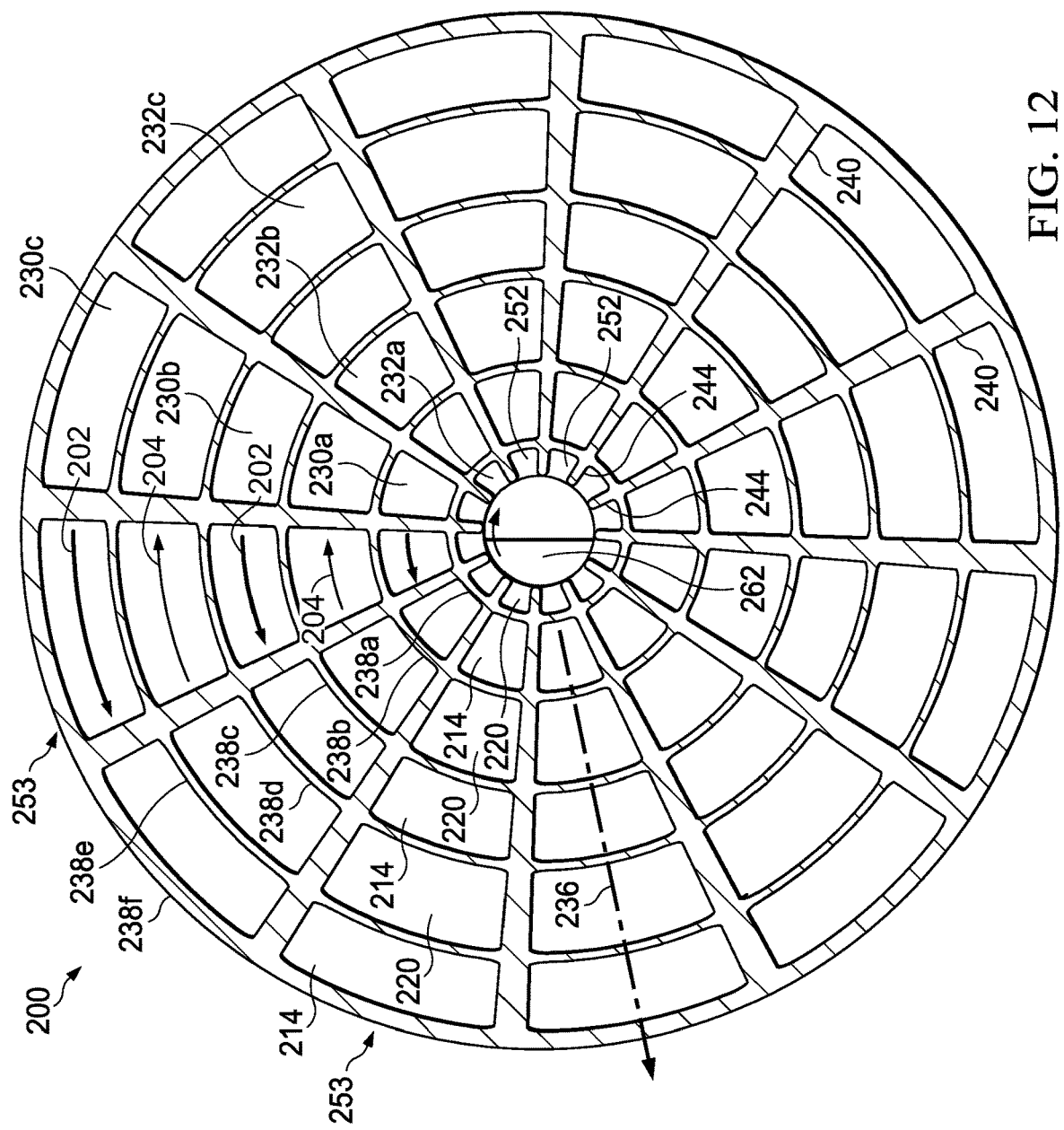
FIG. 12 is a cross-sectional view of the heat transfer device of FIG. 3, taken along line 12-12 of FIG. 5 through a central section of the heat transfer device.
Figure 11:
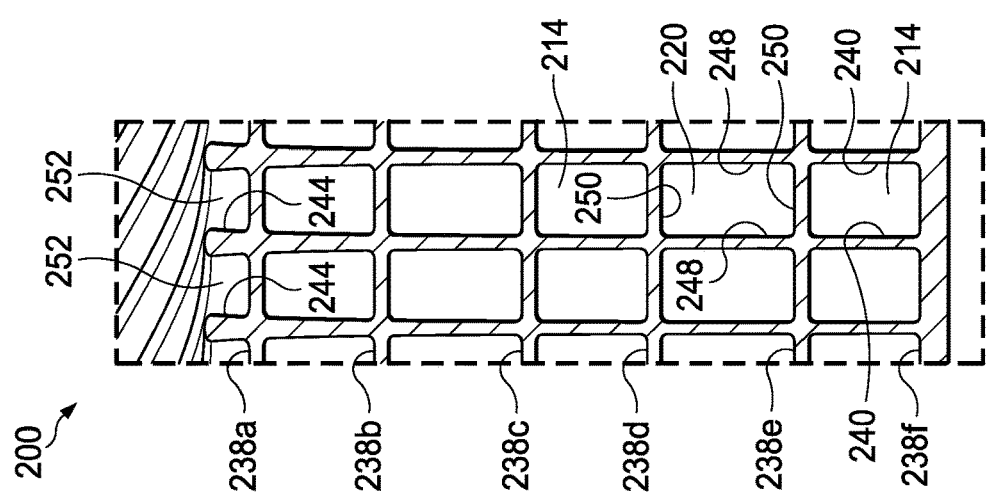
FIG. 11 is a fragmentary sectional view of the heat transfer device of FIG. 3, taken around the region indicated in FIG. 9.

Each helical fluid channel 214, 220 is bounded by a pair of helical walls 240 and one or more of nested tubular walls 238a-238f (see FIGS. 11 and 12). Each of hot helical fluid channels 214 of hot channel layers 230a-230c and cold helical fluid channels 220 of cold channel layers 232a-232c has a pair of rotationally-offset channel walls 248 provided by an adjacent pair of helical walls 240. The same pair of adjacent helical walls 240 forms the rotationally-offset channel walls 248 of a helical column 253 of alternating hot and cold helical fluid channels 214, 220. Each helical fluid channel 214 of hot channel layers 230a-230c and each helical fluid channel 220 of cold channel layers 232b, 232c has a pair of radially-spaced channel walls 250 provided by an adjacent pair of tubular walls of nested tubular walls 238a-238f. However, each helical fluid channel 220 of cold channel layer 232a has only one wall that is formed by a tubular wall, namely, innermost tubular wall 238a. More specifically, the helical fluid channels 220 of cold channel layer 232a are open helical passages 252 having rotationally-offset channel walls 248 formed by protruding helical ribs 244 at radially inner portions of helical walls 240. Each helical passage 252 is radially outward of and continuous with a linear core passageway 262 that is coaxial with central axis 234 (also see FIGS. 4 and 5). Within examples, helical walls 240 may not protrude into the lumen of the innermost nested tubular wall, and thus open helical passages 252 are not formed.

In the depicted example, the thickness of hot channel layers 230a-230c, measured radially, is different from that of cold channel layers 232a-232c (see FIGS. 9-12). The thickness of the hot channel layers relative to the thickness of the cold channel layers can be selected to optimize performance, such as to provide the desired ratio of hot and cold wetted surface areas, and/or to accommodate differences in the viscosity of the fluids, among others.

Each channel layer 230a-230c and 232a-232c has an inlet end 264 opposite an outlet end 266 (see FIGS. 9, 10, 13, and 14). Inlet end 264 of each hot channel layer 230a-230c is adjacent end section 222b, and outlet end 266 of each hot channel layer is adjacent end section 222a (also see FIGS. 4 and 5). This arrangement is logical because end section 222b contains hot intake 210 and end section 222a contains hot outtake 212. Accordingly, the positions of inlet end 264 and outlet end 266 are switched for cold channel layers 232a-232c relative to hot channel layers 230a-230c. More specifically, inlet end 264 of each cold channel layer 232a-232c is adjacent end section 222a, and outlet end 266 of each cold channel layer 232a-232c is adjacent end section 222b. The inlet end 264 of each hot channel layer 230a-230c and cold channel layer 232a-232c includes a channel inlet 268 of each helical fluid channel 214 or 220 of the channel layer, and the outlet end 266 of the channel layer includes a channel outlet 270 of the helical fluid channel.

Each manifold 223, 224, 226, 228 of heat transfer device 200 provides fluid communication between a port of the device (i.e., one of hot intake 210, hot outtake 212, cold intake 216, and cold outtake 218) and each hot helical fluid channel 214 or each cold helical fluid channel 220; see FIG. 9. Manifolds 223, 224, 226, and 228 are similar in structure; corresponding features are identified with an appended letter "a" for parts of hot inflow manifold 223, "b" for parts of hot outflow manifold 224, "c" for parts of cold inflow manifold 226, and "d" for parts of cold outflow manifold 228.

Each manifold includes a plenum, namely, a hot inflow plenum 272a, a hot outflow plenum 272b, a cold inflow plenum 272c, or a cold outflow plenum 272d. Each plenum 272a-272d directly communicates with the corresponding port, but directly communicates with only a subset of the channel inlets 268 or channel outlets 270 of helical fluid channels 214 or helical fluid channels 220 of each channel layer. In the depicted example, each plenum directly communicates with only one-half (six) of the channel inlets or channel outlets of the helical fluid channels of each corresponding hot or cold channel layer.

Inflow manifolds 223, 226 also include distribution channels 274a or distribution channels 274c, respectively (see FIGS. 9, 10, 13, and 14). Each distribution channel 274a of inflow manifold 223 provides fluid communication between inflow plenum 272a and channel inlets 268 of one of the remaining subsets of hot helical fluid channels 214 of one of hot channel layers 230a-230c, where the remaining subset is laterally offset from, and not in direct fluid communication with, the inflow plenum. Similarly, each distribution channel 274c of inflow manifold 226 provides fluid communication between inflow plenum 272c and channel inlets 268 of one of the remaining subsets of cold helical fluid channels 220 of one of cold channel layers 232a-232c, where the remaining subset is laterally offset from, and not in direct fluid communication with, the inflow plenum.

Outflow manifolds 224, 228 also include collection channels 274b or collection channels 274d, respectively (see FIGS. 9, 10, 13, and 14). Each collection channel 274b of outflow manifold 224 provides fluid communication between outflow plenum 272b and channel outlets 270 of one of the remaining subsets of hot helical fluid channels 214 of one of hot channel layers 230a-230c, where the remaining subset is laterally offset from, and not in direct fluid communication with, the outflow plenum. Similarly, each distribution channel 274d of outflow manifold 228 provides fluid communication between plenum 272d and channel outlets 270 of one of the remaining subsets of cold helical fluid channels 220 of one of cold channel layers 232a-232c, where the remaining subset is laterally offset from, and not in direct fluid communication with, the outflow plenum.

Figure 13:
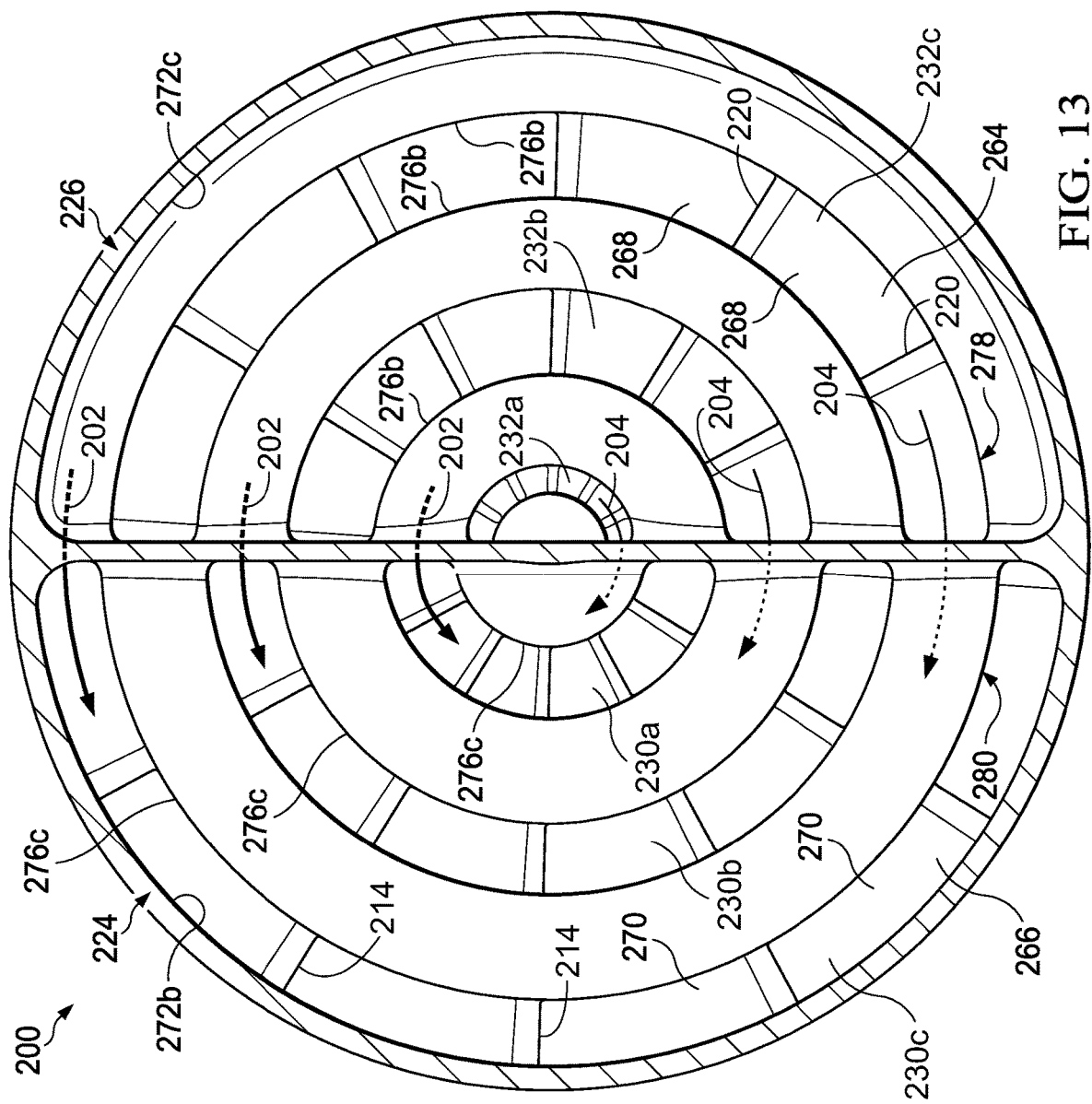
FIG. 13 is a cross-sectional view of the heat transfer device of FIG. 3, taken generally along line 13-13 of FIG. 5 through a pair of manifolds located near one end of the heat transfer device.
Figure 14:
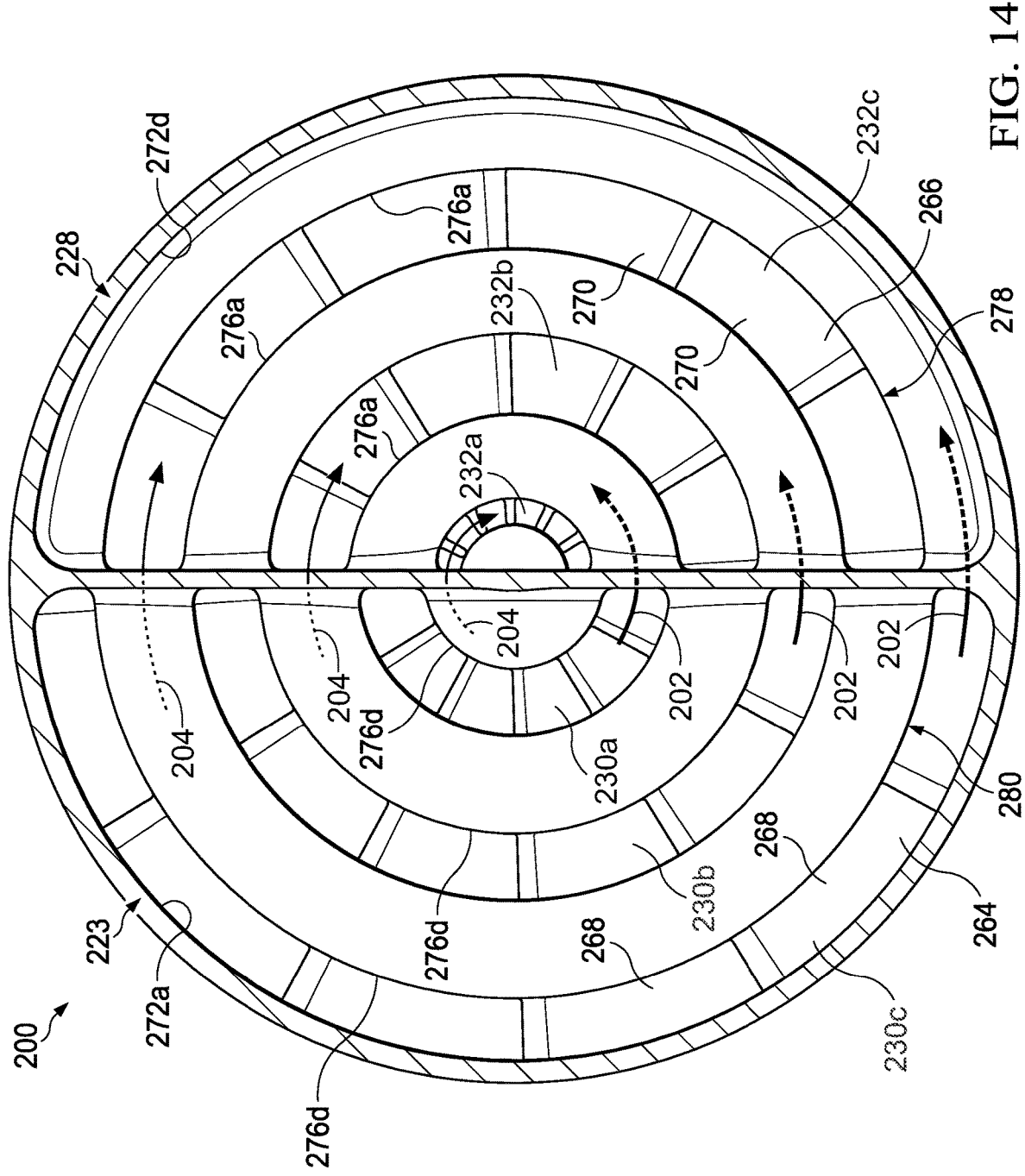
FIG. 14 is another cross-sectional view of the heat transfer device of FIG. 3, taken generally along line 14-14 of FIG. 5 through another pair of manifolds located near the opposite end of the heat transfer device.

Each distribution channel 274a, 274c and each collection channel 274b, 274d is at least partially bounded by a corresponding end cap (see FIGS. 9, 13, and 14). Distribution channels 274a are at least partially bounded by end caps 276a. Distribution channels 274c are at least partially bounded by end caps 276c. Collection channels 274b are at least partially bounded by end caps 276b. Collection channels 274d are at least partially bounded by end caps 276d. Each distribution channel 274a, each collection channel 274b, each of two of three distribution channels 274c, and each of two of three collection channels 274d defines an arcuate longitudinal axis that extends along a semicircular portion of the inlet end or the outlet end of a hot or cold channel layer, and along a plane that is orthogonal to the longitudinal axis of the heat transfer device.

Each inlet end 264 and each outlet end 266 of each channel layer 230a-230c and 232a-232c has an aligned portion 278 and an offset portion 280. Channel inlets 268 or channels outlets 270 of aligned portion 278 are axially aligned with, and directly communicate with, the corresponding plenum 272a, 272b, 272c, or 272d. Channel inlets 268 or channels outlets 270 of offset portion 280 are laterally offset from the corresponding plenum, and are axially aligned instead with an adjacent plenum. Each end cap 276a-276d forms a wall of a corresponding distribution channel 274a or 274c, or corresponding collection channel 274b or 274d, and separates the adjacent plenum from the corresponding distribution or collection channel.

FIGS. 13 and 14 show flow paths 202, 204 of the first and second fluids with respect to manifolds 223, 224, 226, and 228. The line weights of arrows representing each flow path decrease as the flow path enters distribution channels 274a or 274c from the corresponding inflow plenum 272a or 272c, or increases as the flow path enters an outflow plenum 272b or 272d from corresponding collection channels 274b or 274d.

Figure 10:
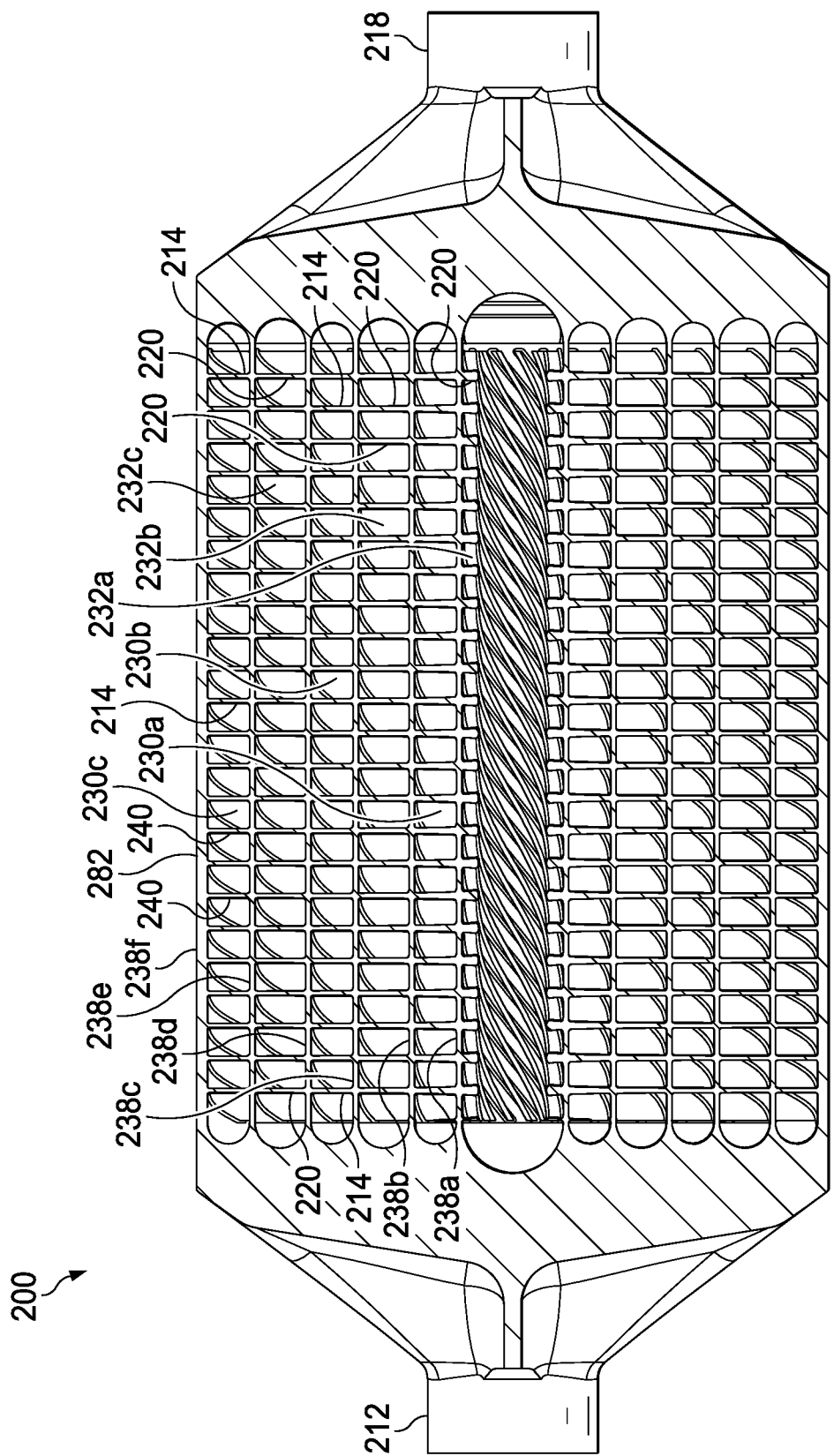
FIG. 10 is a sectional view of the heat transfer device of FIG. 3, taken along line 10-10 of FIG. 4.

Outermost tubular wall 238f also forms a cylindrical portion of a housing 282 (interchangeably called a shell) of heat transfer device 200 (see FIGS. 9 and 10). Accordingly, the outermost tubular wall 238f has a thicker wall than the other tubular walls 238a-238e of the set of nested tubular walls, to make heat transfer device 200 more capable of withstanding large pressure differences between the inside and the outside of the device. The wall of outermost tubular wall 238f smoothly transitions to a peripheral wall of each end section 222a, 222b (see FIG. 9).

In the present example, all components of heat transfer device 200 are additively manufactured as a single monolithic unit. Such unitarity reduces part count and production time over conventionally manufactured heat exchangers. Such unitarity also reduces overall weight and volume of the heat transfer device by eliminating constraints of traditional manufacturing. Unitarity and use of a single material in printing also improves heat transfer performance by eliminating joints and interfaces and maximizing wetted surface area. Additive manufacturing also allows shapes and structures optimal for heat transfer that are not achievable in traditional manufacturing.

An example of heat transfer device 200, intended for illustration only, has a 100 KW heat transfer capacity. The exemplary device has a mass of about 45 pounds (20.4 kilograms) and is formed of a nickel-based alloy. The cold wetted surface area is about 1350 square inches (0.87 square meter), and the hot wetted surface area is about 1690 square inches (1.10 square meter). The outer diameter is 7.45 inches (0.19 meter), the overall length is 17 inches (0.43 meter), and the working length is 9.2 inches (0.23 meter).

C. Heat Transfer Devices with Protrusions in Helical Fluid Channels

This subsection describes illustrative heat transfer devices 300, 400, and 500 having protrusions each projecting into the lumen of a helical fluid channel; see FIGS. 15-17. The protrusions are enhancements to the heat transfer surfaces of the helical fluid channels and may improve the efficiency of heat transfer between the fluid channels, potentially allowing the heat transfer device to be more compact.

FIG. 15 shows a fragmentary, sectional portion of heat transfer device 300, which is identical to heat transfer device 200 of subsection B, except for the addition of protrusions 386 (compare with FIG. 11). Heat transfer device 300 has hot helical fluid channels 314 and cold helical fluid channels 320, which correspond in number and position to hot helical fluid channels 214 and cold helical fluid channels 220 of heat transfer device 200. Each helical fluid channel 314 or helical fluid channel 320 has a lumen 388 and contains a pair of protrusions 386. Each protrusion 386 of the pair projects into the lumen from a helical wall 340, to a free edge of the protrusion that is spaced from the walls of the helical fluid channel. The pair of protrusions 386 project into the lumen from a pair of helical walls 340 that are rotationally adjacent one another.

FIG. 16 shows a fragmentary, sectional portion of heat transfer device 400, which is identical to heat transfer device 200 of subsection B, except for the addition of protrusions 486 (compare with FIG. 11). Heat transfer device 400 has hot helical fluid channels 414 and cold helical fluid channels 420, which correspond in number and position to hot helical fluid channels 214 and cold helical fluid channels 220 of heat transfer device 200. Each hot helical fluid channel 414 and each cold helical fluid channel 420 has a lumen 488 and contains a pair of protrusions 486. Each protrusion 486 of the pair projects into the lumen from a helical wall 440, to a free edge of the protrusion that is spaced from the walls of the helical fluid channel. The pair of protrusions 486 project into the lumen from a pair of helical walls 440 that are rotationally adjacent one another. Protrusions 486 are similar to protrusions 386 of heat transfer device 300, except that they are radially offset from one another within a given helical fluid channel, which can improve mixing of fluid in the helical fluid channel.

FIG. 17 shows a fragmentary, sectional portion of heat transfer device 500, which is identical to heat transfer device 200 of subsection B, except for the addition of protrusions 586 (compare with FIG. 11). Heat transfer device 500 has hot helical fluid channels 514 and cold helical fluid channels 520, which correspond in number and position to hot helical fluid channels 214 and cold helical fluid channels 220 of heat transfer device 200. Heat transfer device 500 also has nested tubular walls 538a-538f and helical walls 540, which intersect to bound the hot helical fluid channels and the cold helical fluid channels, as described above for heat transfer device 200. Each hot helical fluid channel 514 and each cold helical fluid channel 520 has a lumen 588 and a pair of protrusions 586. Each protrusion 586 of the pair projects radially into the lumen of a given helical fluid channel from a tubular wall of nested tubular walls 538a-538f, to a free edge of the protrusion that is spaced from the walls of the helical fluid channel. The pair of protrusions 586 project into the lumen from a pair of adjacent tubular walls of the nested tubular walls 538a-538f.

The protrusions of this example may be elongated along the helical fluid channels to form flanges (interchangeably called ribs), which may be helical flanges. Each helical flange may extend along at least a portion of a helical path followed by a corresponding helical fluid channel(s). However, in the other examples, the flanges may be non-helical. The protrusions in each of the heat transfer devices of this subsection improve the efficiency of heat transfer by increasing the wetted surface area of conductive material of the heat transfer device that is in contact with each of the fluids. In other examples, only one or more than two protrusions project into the lumen of a given helical fluid channel. In other examples, two protrusions project into the lumen from the same helical wall or the same tubular wall, or from a helical wall and a tubular wall. In other examples, the protrusions are present in only a subset of the channel layers, such as only the hot channel layers or only the cold channel layers.

D. Heat Transfer Device with Openings in a Helical Wall

This subsection describes an illustrative heat transfer device 600 having a helical wall defining at least one opening that provides fluid communication, mixing, and heat transfer between a pair of adjacent helical fluid channels within a channel layer; see FIG. 18.

FIG. 18 shows a fragmentary, sectional portion of heat transfer device 600, which is identical to heat transfer device 200 of subsection B, except for the addition of openings 690 in a helical wall 640 (compare with FIG. 11). Heat transfer device 600 has hot helical fluid channels 614 and cold helical fluid channels 620, which correspond in number and position to hot helical fluid channels 214 and cold helical fluid channels 220 of heat transfer device 200.

Each opening 690 extends through helical wall 640 to each of a pair of adjacent hot helical fluid channels 614 or cold helical fluid channels 620 in the same channel layer, and thus interchangeably is described as a through-opening or through-hole. Each opening is circular. However, in other examples, the opening can be non-circular, such as a helical opening elongated along a helical path followed by the helical wall, or elongated transverse to the helical path, among others. With any suitable geometry, the opening provides fluid communication between the pair of adjacent channels at a position intermediate the inlets and outlets of the pair of channels. Openings 690 can improve the efficiency of the heat transfer device by encouraging mixing between adjacent channels. In other examples, openings 690 are formed in two or more helical walls, such as each helical wall 640. The openings can decrease the weight of the device because the openings in a helical wall make the wall lighter. In some examples, two or more openings 690 provide fluid communication between a given helical fluid channel and an adjacent helical fluid channel, at two or more positions along the given helical fluid channel.

E. Aerospace Vehicle Including a Heat Transfer Device

Figure 19:
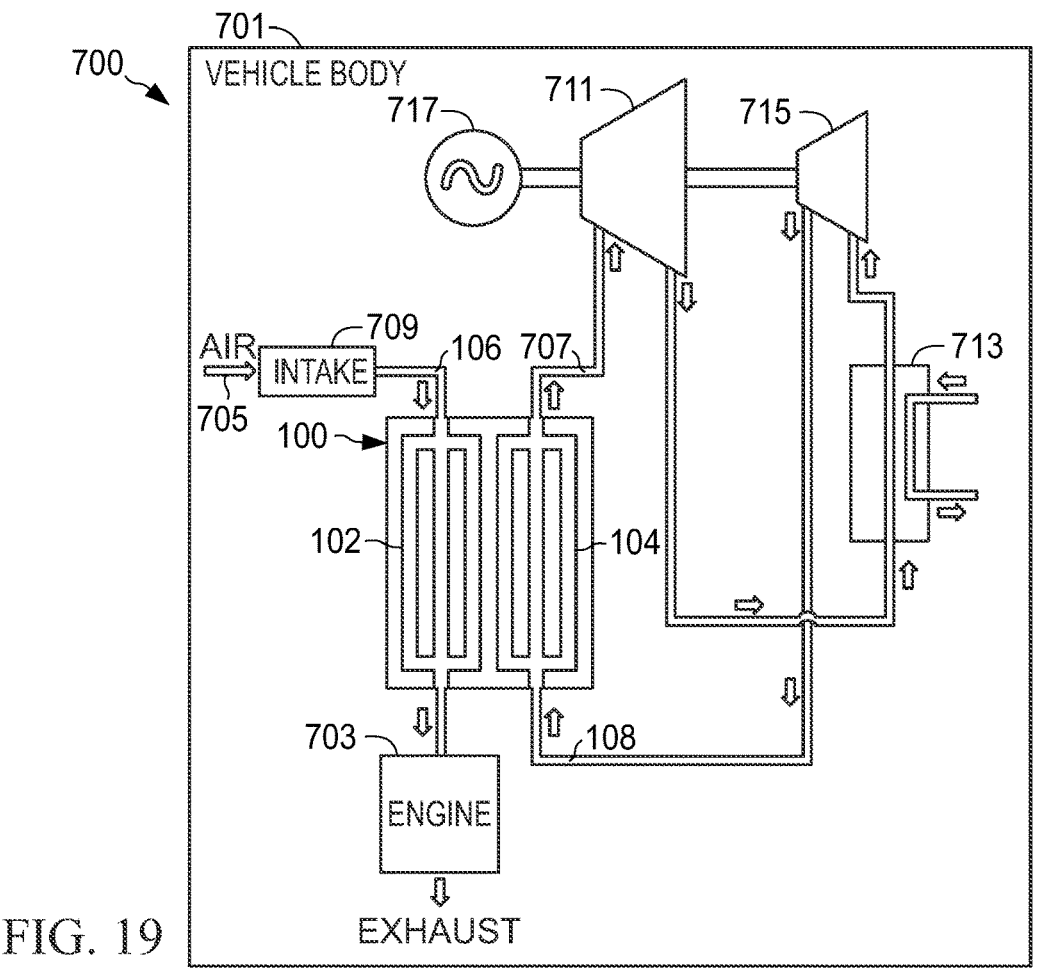
FIG. 19 is a schematic diagram of an illustrative aerospace vehicle incorporating the heat transfer device of FIG. 1 in a thermodynamic cycle that converts heat to another form of energy.

This subsection describes an illustrative aerospace vehicle 700 including heat transfer device 100, which is incorporated in a power cycle; see FIG. 19 (also see FIGS. 1 and 2 and the Overview section above).

Aerospace vehicle 700 has a vehicle body 701 and an engine 703 connected to the vehicle body and configured to power the vehicle body in a flight mode. The vehicle body can include a fuselage and one or more airfoils, such as wings. The aerospace vehicle can be an aircraft, a spacecraft, a rotorcraft, a missile, or a combination thereof, among others. Engine 703 provides propulsion for the vehicle and can, for example, be an airbreathing jet engine (such as a turbojet, turbofan, ramjet, or pulse jet engine), a rocket engine, a propeller/rotor engine, or the like.

Heat transfer device 100 is connected to vehicle body 701 and/or engine 703. The heat transfer device can be utilized to transfer heat between any suitable first fluid 106 and second fluid 108. In the example depicted, heat transfer device 100 transfers heat from air 705, as first fluid 106, to supercritical carbon dioxide (SCCD) 707, as second fluid 108. In other examples, heat transfer device 100 onboard aerospace vehicle 700 transfers heat from oil to air, air to air, water/steam to air, oil to water/steam, air to fuel, water/steam to fuel, or vice versa, among others.

The first flow path 102 of heat transfer device 100 is in fluid communication with an engine intake 709 of engine 703. Air 705 enters engine intake 709 from outside aerospace vehicle 700 and has a high temperature due to the speed of the vehicle, which may be a hypersonic airplane. The air is cooled by passing it through heat transfer device 100 on first flow path 102, before entering a combustion chamber(s) of engine 703. The air may be cooled upstream of a fan or compressor stage of the engine, to mitigate the risk of heat damage. Cooling air upstream of the engine's combustion chamber could have two effects: limiting engine performance, and preventing damage to downstream engine components such as turbines or exhaust nozzles. In other examples, instead of entering an engine intake, the air enters an intake of an environmental control system of the aerospace vehicle.

SCCD 707 can be used as the working fluid in a thermodynamic cycle to convert heat to another form of energy, such as electrical, mechanical, and/or chemical energy. The second flow path 104 of heat transfer device 100 is in fluid communication with a turbine 711, a heat exchanger 713, and a compressor 715 of a heat-to-power thermodynamic cycle. Rotation of turbine 711 is driven by SCCD 707 received from heat transfer device 100 after the SCCD 707 has been heated with thermal energy received from air 705. The rotation of turbine 711 drives a generator 717, which converts mechanical energy to electrical energy. The electrical energy can be stored or used directly. Rotation of the turbine also powers compressor 715, which compresses SCCD 707 after additional thermal energy has been removed by heat exchanger 713. The compressed SCCD 707 then flows back to heat transfer device 100 and the cycle is repeated.

F. Power Plant Including a Heat Transfer Device

Figure 20:
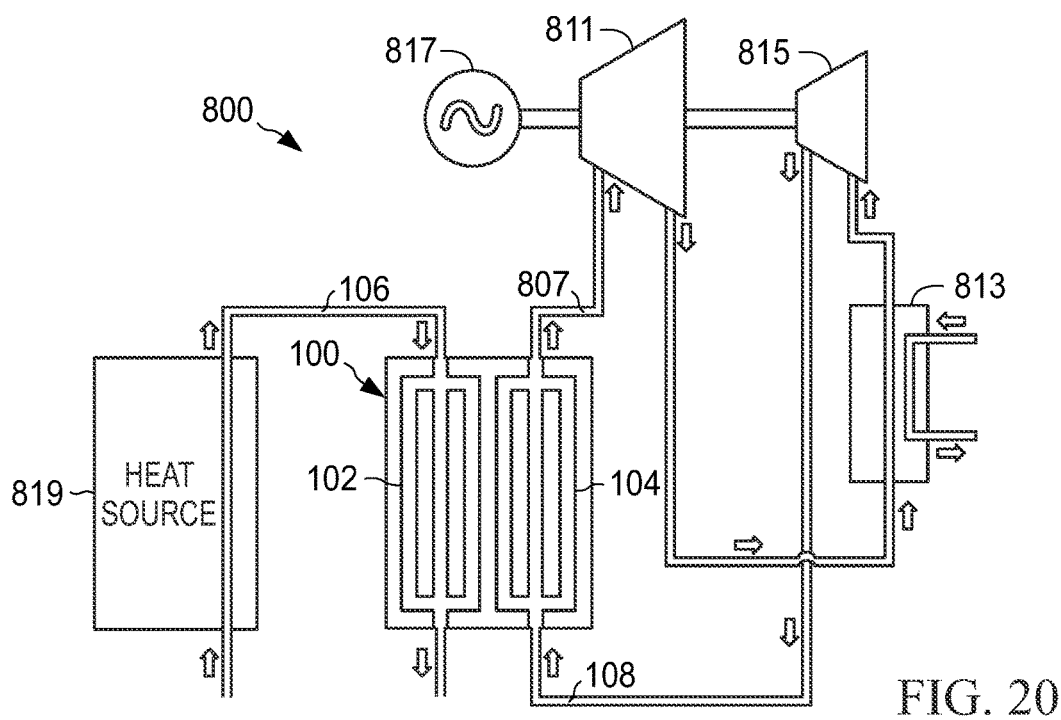
FIG. 20 is a schematic diagram of an illustrative power plant incorporating the heat transfer device of FIG. 1 in a thermodynamic cycle that converts heat to another form of energy.

This subsection describes an illustrative power plant 800 including heat transfer device 100, which is incorporated in a heat-to-power thermodynamic cycle; see FIG. 20 (also see FIGS. 1 and 2 and the Overview section above).

The power cycle transfers heat from a first fluid 106, such as steam, flowing through heat transfer device 100 on first flow path 102, to a second fluid 108, such as supercritical carbon dioxide (SCCD) 807, on second flow path 104. The first fluid is heated by a heat source 819 upstream of heat transfer device 100. The heated second fluid flows in a closed loop from second flow path 104 of heat transfer device 100 through a turbine 811, a heat exchanger 813, and a compressor 815, and back to heat transfer device 100, as described above in subsection E. Rotation of turbine 811 drives a generator 817 as explained above in subsection E.

G. Method of Transferring Heat

Figure 21:
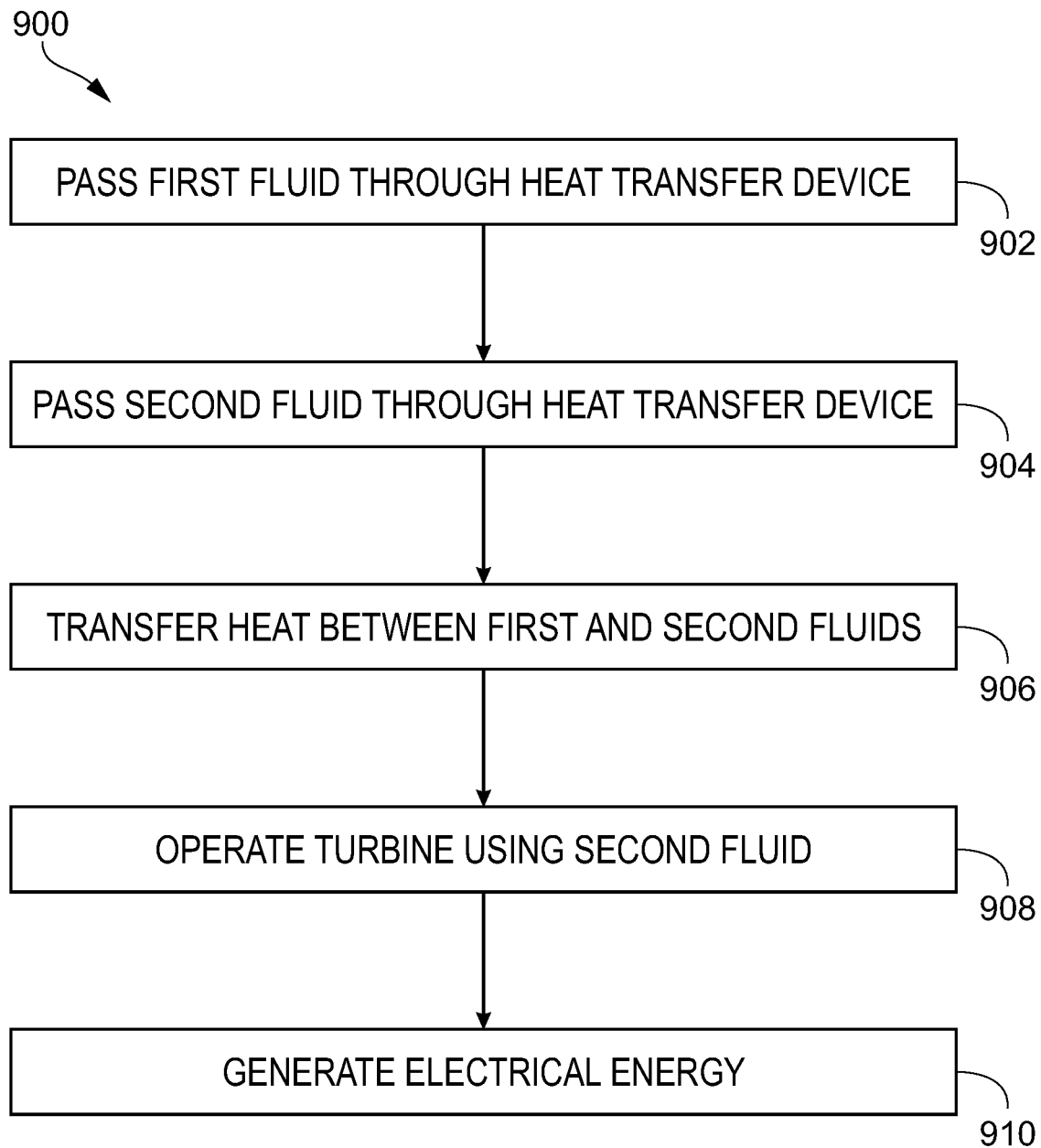
FIG. 21 is a flowchart depicting steps of an illustrative method of transferring heat between a pair of fluids using a heat transfer device of the present disclosure.

This subsection describes steps of an illustrative method 900 of transferring heat between fluids using a heat transfer device having helical fluid channels; see FIG. 21. Aspects of heat transfer devices described above may be utilized in the method steps described below. Where appropriate, reference may be made to components and systems that may be used in carrying out each step. These references are for illustration, and are not intended to limit the possible ways of carrying out any particular step of the method. Although various steps of method 900 are described below and depicted in FIG. 21, the steps need not necessarily all be performed, and in some cases may be performed simultaneously or in a different order than the order shown, and the method may not recite the complete process or all steps of the method.

At step 902, a first fluid is passed through a heat transfer device. The heat transfer device has any suitable combination of elements and features described elsewhere herein.

At step 904, a second fluid is passed through the heat transfer device. The first and second fluids pass through the heat transfer device at the same time, but without contacting one another. The first and second fluids pass through the heat transfer device in opposite directions from one another, on respective helical paths that may be concentric with, and parallel to, one another.

At step 906, heat is transferred between the first and second fluids, such that the second fluid is heated and the first fluid is cooled.

At step 908, the heated second fluid is used to operate a turbine. The heated second fluid passes through the turbine to produce rotation thereof.

At step 910, electrical energy is generated using mechanical energy from the turbine.

H. Illustrative Aerospace Vehicles and Associated Method

Figure 22:
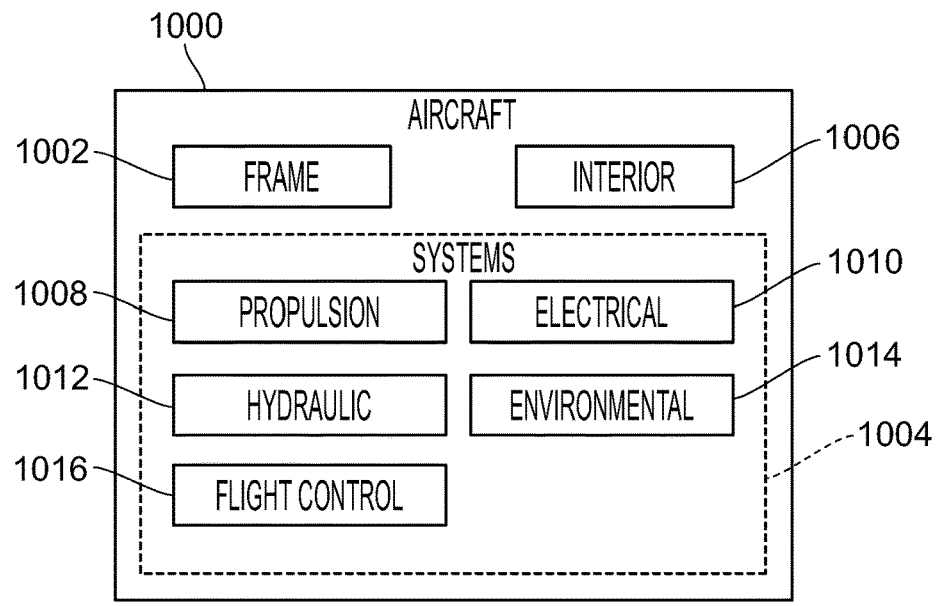
FIG. 22 is a schematic diagram of an illustrative aircraft.
Figure 23:
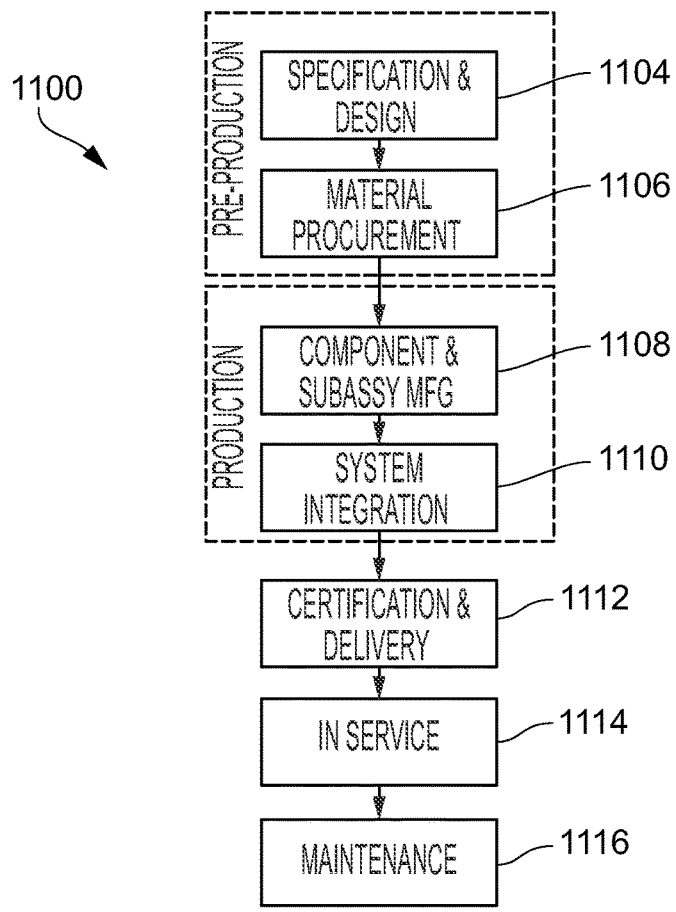
FIG. 23 is a flowchart depicting steps of an illustrative aircraft manufacturing and service method.

Examples disclosed herein may be described in the context of an illustrative aircraft or aerospace vehicle 1000 (see FIG. 22) and an illustrative aerospace vehicle manufacturing and service method 1100 (see FIG. 23). Method 1100 includes a plurality of processes, stages, or phases. During pre-production, method 1100 may include a specification and design phase 1104 of aerospace vehicle 1000 and a material procurement phase 1106. During production, a component and subassembly manufacturing phase 1108 and a system integration phase 1110 of aerospace vehicle 1000 may take place. Thereafter, aerospace vehicle 1000 may go through a certification and delivery phase 1112 to be placed into in-service phase 1114. While in service (e.g., by an operator), aerospace vehicle 1000 may be scheduled for routine maintenance and service phase 1116 (which may also include modification, reconfiguration, refurbishment, and so on of one or more systems of aerospace vehicle 1000). While the examples described herein relate generally to the production and operational use of aerospace vehicle 1000, they may be practiced at other stages of method 1100.

Each of the processes of method 1100 may be performed or carried out by a system integrator, a third party, and/or an operator (e.g., a customer). For the purposes of this description, a system integrator may include, without limitation, any number of aerospace vehicle manufacturers and major-system subcontractors; a third party may include, without limitation, any number of vendors, subcontractors, and suppliers; and an operator may be an airline, leasing company, military entity, service organization, and so on.

As shown in FIG. 22, aerospace vehicle 1000 produced by illustrative method 1100 may include a frame 1002 with a plurality of systems 1004 and an interior 1006. Examples of plurality of systems 1004 include one or more of an engine system 1008, an electrical system 1010, a hydraulic system 1012, an environmental control system 1014, and a flight control system 1016. Each system may comprise various subsystems, such as controllers, processors, actuators, effectors, motors, generators, etc., depending on the functionality involved. Any number of other systems may be included. The engine system 1008 includes an engine connected to the aerospace vehicle body and configured to power the aerospace vehicle body in a flight mode. Electrical system 1010 and/or environmental control system 1014 of aerospace vehicle 1000 includes a heat transfer device. For instance, in an example, aerospace vehicle 1000 includes heat transfer device 100, 200, 300, 400, 500, or 600.

Although an aerospace example is shown, the principles disclosed herein may be applied to other industries, such as the power industry, automotive industry, rail transport industry, and nautical engineering industry. Accordingly, in addition to aerospace vehicle 1000, the principles disclosed herein may apply to other vehicles, e.g., land vehicles, marine vehicles, etc.

Apparatuses and methods shown or described herein may be employed during any one or more of the stages of the aerospace vehicle manufacturing and service method 1100. For example, components or subassemblies corresponding to component and subassembly manufacturing phase 1108 may be fabricated or manufactured in a manner similar to components or subassemblies produced while aerospace vehicle 1000 is operating during in-service phase 1114. Also, one or more examples of the apparatuses, methods, or combinations thereof may be utilized during manufacturing phase 1108 and system integration phase 1110, for example, by substantially expediting assembly of or reducing the cost of aerospace vehicle 1000. Similarly, one or more examples of the apparatus or method realizations, or a combination thereof, may be utilized, for example and without limitation, while aerospace vehicle 1000 is in in-service phase 1114 and/or during maintenance and service phase 1116.

Illustrative Combinations and Additional Examples

This section describes additional aspects and features of heat transfer devices with helical fluid channels, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A device for transferring heat between a first fluid and a second fluid, the device comprising: (i) a set of nested tubular walls; (ii) a plurality of helical walls intersecting each of the nested tubular walls to form one or more first channel layers nested with one or more second channel layers, each first channel layer and each second channel layer including a plurality of helical fluid channels; (iii) a first intake and a first outtake in fluid communication with one another via the plurality of helical fluid channels of each first channel layer, for flow of the first fluid through the device from the first intake to the first outtake; and (iv) a second intake and a second outtake in fluid communication with one another via the plurality of helical fluid channels of each second channel layer, for flow of the second fluid through the device from the second intake to the second outtake.

A2. The device of paragraph A1, wherein each helical fluid channel of the plurality of helical fluid channels of each first channel layer and each second channel layer has a pair of channel walls formed by a pair of helical walls of the plurality of helical walls, and wherein, optionally, the pair of channel walls are rotationally offset from one another about a central axis defined by the set of nested tubular walls.

A3. The device of paragraph A1 or A2, wherein each helical fluid channel of the plurality of helical fluid channels of at least one first channel layer and at least one second channel layer has a pair of channel walls spaced radially from one another and formed by a pair of nested tubular walls of the set of nested tubular walls.

A3.1. The device of any of paragraphs A1 to A3, wherein each helical fluid channel of the plurality of helical fluid channels of each first channel layer and each second channel layer is bounded by a pair of the nested tubular walls and a pair of the helical walls.

A4. The device of any of paragraphs A1 to A3.1, wherein the one or more first channel layers and the one or more second channel layers are arranged in a radial series of at least two first channel layers alternating with at least two second channel layers.

A4.1. The device of any of paragraphs A1 to A4, wherein a radial thickness of each first channel layer is different from a radial thickness of each second channel layer.

A5. The device of any of paragraphs A1 to A4.1, wherein the helical walls of the plurality of helical walls have the same helical lead and/or the same radius as one another.

A6. The device of any of paragraphs A1 to A5, wherein the set of nested tubular walls includes an outermost tubular wall forming at least part of a periphery of the device and at least three, four, or five nested tubular walls of successively smaller diameter inside the outermost tubular wall.

A6.1. The device of paragraph A6, wherein the outermost tubular wall has a greater thickness, measured radially than each other nested tubular wall of the set of nested tubular walls.

A7. The device of any of paragraphs A1 to A6.1, wherein the set of nested tubular walls, the plurality of helical walls, the first and second intakes, and the first and second outtakes are formed collectively as a single monolithic unit.

A8. The device of any of paragraphs A1 to A7, wherein at least one of the first intake and the second intake includes one or more flow-steering vanes configured to encourage swirling flow of fluid passing through the at least one of the first intake and the second intake.

A9. The device of any of paragraphs A1 to A8, further comprising a first inflow manifold providing fluid communication between the first intake and each helical fluid channel of the plurality of helical fluid channels of each first channel layer, the first inflow manifold including a plenum and a distribution channel extending from the plenum, the plenum being in direct fluid communication with only a subset of the plurality of helical fluid channels of a first channel layer of the one or more first channel layers, the distribution channel providing fluid communication between the plenum and another subset of the plurality of helical fluid channels of the first channel layer of the one or more first channel layers.

A9.1. The device of paragraph A9, wherein the first inflow manifold includes a respective distribution channel for each first channel layer.

A9.2. The device of paragraph A9 or A9.1, the plenum being a first inflow plenum, further comprising a second inflow manifold providing fluid communication between the second intake and each helical fluid channel of the plurality of helical fluid channels of each second channel layer, the second inflow manifold including a second inflow plenum and a second distribution channel extending from the second inflow plenum, the second inflow plenum being in direct fluid communication with only a subset of the plurality of helical fluid channels of a second channel layer of the one or more second channel layers, the second distribution channel providing fluid communication between the second inflow plenum and another subset of the plurality of helical fluid channels of the second channel layer of the one or more second channel layers A10. The device of any of paragraphs A9 to A9.2, further comprising: a second outflow manifold located adjacent the first inflow manifold and including an outflow plenum, the second outflow manifold providing fluid communication between each helical fluid channel of the plurality of helical fluid channels of each second channel layer and the second outtake; and an end cap located at an inlet end of the first channel layer of the one or more first channel layers, the end cap forming a wall of the distribution channel and separating the outflow plenum of the second outflow manifold from the distribution channel of the first inflow manifold.

A11. The device of any of paragraphs A1 to A10, wherein the set of nested tubular walls defines a central axis, and wherein the first intake, the first outtake, the second intake, and the second outtake define respective axes that are parallel to the central axis.

A12. The device of paragraph A11, wherein the respective axes are coplanar with one another.

A13. The device of any of paragraphs A1 to A12, wherein each helical wall of the plurality of helical walls provides a load path extending radially and continuously from an outermost tubular wall to an innermost tubular wall of the set of nested tubular walls.

A14. The device of any of paragraphs A1 to A13, further comprising a flange projecting from a helical wall of the plurality of helical walls, or from a nested tubular wall of the set of nested tubular walls, and into a lumen of a helical fluid channel of the plurality of helical fluid channels of a first channel layer or a second channel layer.

A14.1 The device of paragraph A14, wherein the flange is a helical flange.

A14.2. The device of paragraph A14 or A14.1, further comprising a plurality of flanges each projecting from the same helical wall of the plurality of helical walls, or from the same tubular wall of the set of nested tubular walls, into a lumen of a helical fluid channel of the plurality of helical fluid channels of a first channel layer or a second channel layer.

A15. The device of any of paragraphs A1 to A14.2, wherein each helical wall of at least a subset of the plurality of helical walls projects into a lumen of an innermost nested tubular wall of the set of nested tubular walls such that the at least a subset of the plurality of helical walls forms a plurality of open helical passages that are in fluid communication with one another within the innermost tubular wall and in fluid communication with one of the first and second intakes and a corresponding one of the first and second outtakes.

A16. The device of any of paragraphs A1 to A15, further comprising a first inflow manifold providing fluid communication between the first intake and the plurality of helical fluid channels of each first channel layer, the first inflow manifold including an inflow plenum and a distribution channel, the distribution channel being located at an inlet end of a first channel layer and directing fluid from the plenum to channel inlets of only a subset of the plurality of helical fluid channels of the first channel layer.

A16.1. The device of paragraph A16, wherein the distribution channel defines a longitudinal axis lying in a plane that is orthogonal to a central axis of the set of nested tubular walls.

A16.2. The device of paragraph A16 or A16.1, wherein the one or more first channel layers include two or more first channel layers, and wherein the first inflow manifold includes a respective distribution channel for each first channel layer of the two or more first channel layers.

A16.3. The device of any of paragraphs A16 to A16.2, wherein another subset of the plurality of helical fluid channels of the first channel layer has channel inlets that communicate directly with the inflow plenum of the first inflow manifold.

A16.4. The device of any of paragraphs A16 to A16.3, wherein an offset portion of an inlet end of each first channel layer is covered by an end cap, and wherein an aligned portion of the inlet end of each first channel layer communicates directly with the inflow plenum.

A16.5. The device of paragraph A16.4, wherein the offset portion of the inlet end of each first channel layer is offset from the plenum in a direction transverse to a central axis of the set of nested tubular walls, and wherein the aligned portion of the inlet end of each first channel layer is aligned with the inflow plenum along a line parallel to the central axis.

A17. The device of any of paragraphs A1 to A16.5, wherein the device has a central section located between a pair of end sections, wherein the central section includes each of the first and second channel layers, wherein the first intake and the second outtake are provided by one of the end sections, and wherein the second intake and the first outtake are provided by the other of the end sections.

A18. The device of any of paragraphs A1 to A17, wherein the device is configured to provide counterflow of the first and second fluids through the device on respective first and second flow paths that are not in fluid communication with one another.

A19. The device of any of paragraphs A1 to A18, further comprising a protrusion projecting from a helical wall of the plurality of helical walls or from a nested tubular wall of the set and nested tubular walls, into a lumen of a helical fluid channel of the plurality of helical fluid channels of a first channel layer or a second channel layer.

A20. The device of paragraph A19, wherein two or more protrusions collectively project into a lumen of each of two or more helical fluid channels of the plurality of helical fluid channels of one or more channel layers of the first and second channel layers from one of the helical walls, optionally from the same helical wall, optionally into the same first or second channel layer, optionally into at least two channel layers of the first and second channel layers.

A21. The device of paragraph A20, wherein the two or more protrusions are two or more helical flanges that collectively project into the lumen of each of the two or more of the helical fluid channels from one of the helical walls.

A22. The device of any of paragraphs A1 to A21, wherein the plurality of helical fluid channels of a first channel layer of the one or more first channel layers includes a pair of adjacent helical fluid channels having a pair of channel inlets and a pair of channel outlets, and wherein one of the helical walls defines an opening that provides fluid communication between the pair of adjacent helical fluid channels at a position intermediate the pair of channel inlets and the pair of channel outlets.

A23. The device of any of paragraphs A1 to A22, wherein each first channel layer is located between an adjacent pair of the tubular walls, and wherein each second channel layer is located between an adjacent pair of the tubular walls.

A24. The device of any of paragraphs A1 to A23, wherein each first channel layer is radially adjacent a second channel layer, and wherein each second channel layer is radially adjacent a first channel layer.

A25. The device of any of paragraphs A1 to A24, wherein the helical walls of the plurality of helical walls are rotationally offset from one another about a central axis defined by the set of nested tubular walls.

A26. The device of paragraphs A25, wherein the helical walls of the plurality of helical walls have a uniform rotational offset from one another about the central axis.

A27. The device of any of paragraphs A1 to A26, wherein the plurality of helical walls includes at least three, four, five, six, eight, or ten helical walls.

A28. An aerospace vehicle comprising the device of any of paragraphs A1 to A27.

A29. A power plant comprising the device of any of paragraphs A1 to A27.

A30. The aerospace vehicle or power plant of paragraph A28 or A29, wherein the device is in fluid communication with a turbine.

A31. The device of any of paragraphs A1 to A27, wherein the device is configured to receive and heat supercritical carbon dioxide as a working fluid in a thermodynamic cycle.

B1. An aerospace vehicle comprising: (i) a vehicle body; (ii) an engine connected to the vehicle body and configured to power the vehicle body in a flight mode; and (iii) a heat transfer device connected to the vehicle body and/or the engine and including a set of nested tubular walls, a plurality of helical walls intersecting each of the nested tubular walls to form one or more first channel layers nested with one or more second channel layers, each first channel layer and each second channel layer including a plurality of helical fluid channels, a first intake and a first outtake in fluid communication with one another via the helical fluid channels of each first channel layer, for flow of a first fluid through the heat transfer device from the first intake to the first outtake, and a second intake and a second outtake in fluid communication with one another via the plurality of helical fluid channels of each second channel layer, for flow of a second fluid through the heat transfer device from the second intake to the second outtake.

B2. The aerospace vehicle of paragraph B1, wherein the heat transfer device is configured to cool intake air for the engine.

B3. The aerospace vehicle of paragraph B1 or B2, wherein one of the first and second fluids is supercritical carbon dioxide.

B4. The aerospace vehicle of paragraph B3, wherein the heat transfer device is configured to heat the supercritical carbon dioxide for use as a working fluid in a thermodynamic cycle that converts heat to another form of energy.

B5. The aerospace vehicle of any of paragraphs B1 to B4, wherein the heat transfer device is in fluid communication with a turbine.

B6. The aerospace vehicle of any of paragraphs B1 to B5, wherein the aerospace vehicle is a hypersonic airplane.

B7. The aerospace vehicle of any of paragraphs B1 to B6, wherein the heat transfer device includes any limitation or combination of limitations of paragraphs A1 to A27 and A31.

C1. A method of transferring heat between fluids using a heat transfer device including a set of nested tubular walls intersected by a plurality of helical walls to form one or more first channel layers nested with one or more second channel layers, the method comprising: (i) passing a first fluid through the heat transfer device between a first intake and a first outtake via a plurality of helical fluid channels of each of one or more first channel layers of the heat transfer device; and (ii) passing a second fluid through the heat transfer device between a second intake and a second outtake via a plurality of helical fluid channels of each of one or more second channel layers of the heat transfer device.

C2. The method of paragraph C1, wherein passing a first fluid includes passing a first fluid through a plurality of helical fluid channels defined by each of at least two first channel layers of the device, and wherein passing a second fluid includes passing a second fluid through a plurality of helical fluid channels defined by each of at least two second channel layers of the device.

C3. The method of paragraph C1 or C2, wherein the heat transfer device includes any limitation or combination of limitations of paragraphs A1 to A27 and A31.

D1. A device for transferring heat between a first fluid and a second fluid, the device comprising: (i) a central section forming a radial series of first channel layers alternating with second channel layers, each of the first and second channel layers defining a plurality of helical fluid channels, wherein the central section includes a plurality of concentric helical walls, and wherein each helical fluid channel of the plurality of helical fluid channels of each first and second channel layer has a pair of walls formed by a pair of the helical walls; (ii) a first intake and a first outtake in fluid communication with one another via the plurality of helical fluid channels of each first channel layer, for flow of the first fluid through the device; and (iii) a second intake and a second outtake in fluid communication with one another via the plurality of helical fluid channels of each second channel layer, for flow of the second fluid through the device.

D2. The device of paragraph D1, wherein the device includes any limitation or combination of limitations of paragraphs A1 to A27 and A31.

Advantages, Features, and Benefits

The different examples of the heat transfer device described herein provide various advantages over traditional counterflow heat exchangers. The examples disclosed herein may be more compact and/or lighter in weight, may have more wetted surface area per unit volume for heat transfer and thus a greater efficiency of heat transfer, may handle and distribute stress more efficiently, may provide more uniform fluid flow, may offer better mixing within a fluid, and/or may have fewer sharp turns, if any, along each fluid flow path.

Additionally, and among other benefits, illustrative examples described herein provide more efficient pressure containment. The outermost tubular wall may be cylindrical, which takes advantage of inherent hoop strength to handle a large pressure differential between the outermost layer of helical fluid channels and the ambient environment outside the heat transfer device. The tubular walls nested in the outermost tubular wall also may be cylindrical, which also takes advantage of inherent hoop strength to provide the capability to handle a large pressure differential between adjacent hot and cold layers of helical fluid channels. End caps may be located at the inlet and outlet ends of each channel layer, and may be rounded/domed to avoid points of concentrated stress (stress risers) in response to pressure differentials. Helical walls may provide radial load paths each extending from the exterior surface of the heat transfer device to the innermost tubular wall, such that each helical wall efficiently reacts to pressure differentials in tension and the helical walls can collectively react to high pressure differentials.

Additionally, and among other benefits, the helical walls of illustrative examples described herein offer unique characteristics and advantages. The helical walls function not only as efficient structural members but also transfer heat between hot and cold helical fluid channels, thereby increasing the wetted surface area for heat transfer and thus the efficiency of heat transfer. Moreover, the number, helical pitch, and helical lead of the helical walls can be selected to customize the performance of the heat transfer device. Increasing the number of helical walls, decreasing the helical pitch of the helical walls, and decreasing the helical lead of each helical wall, increases the wetted surface area within the device and the pressure-handling capacity of the device, without changing the length of the heat transfer device. Alternatively, decreasing the number of helical walls, increasing the helical pitch of the helical walls, and/or increasing the helical lead of each helical fin reduces the pressure drop through the device, without changing the length of the heat transfer device.

Additionally, and among other benefits, illustrative examples described herein are strengthened substantially with only minimal increases in the thickness of the nested tubular walls and/or the helical walls.

Additionally, and among other benefits, illustrative examples described herein have helical walls and/or tubular walls from which added features (protrusions) project, to increase the wetted surface area for heat transfer.

Additionally, and among other benefits, the fluid flow paths of illustrative examples described herein have no sharp bends, thereby provide a low pressure-drop design.

Additionally, and among other benefits, the intakes, outtakes, and manifolds of illustrative examples described herein have a simplified configuration. The intakes and outtakes may be located at opposite ends of the heat transfer device, and may be parallel and coplanar with one another, and parallel to the longitudinal/central axis of the heat transfer device. This straight-in/straight-out configuration reduces the pressure drop relative to traditional counterflow heat exchangers having elbow interfaces. Each manifold may be configured to communicate with multiple channel layers each containing multiple helical fluid channels, and the same manifold configuration can communicate with any number of channels in a channel layer.

Additionally, and among other benefits, illustrative examples described herein have intakes including swirl initiators that promote smoother introduction of fluids into the channel inlets of helical fluid channels, by creating rotational flow that matches the rotational direction of the helical fluid channels and directs fluid flow into better alignment with the channel inlets, while encouraging mixing within each fluid.

Additionally, and among other benefits, illustrative examples described herein optimize fluid flow for enhanced heat transfer and reduced fluid pressure drop.

No known system or device can perform these functions, particularly with reduced weight and a smaller footprint than traditional heat transfer devices. Thus, the illustrative examples described herein are particularly useful for aerospace vehicles. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An aerospace vehicle comprising:
a vehicle body;
an engine connected to the vehicle body and configured to power the vehicle body in a flight mode; and
a heat transfer device connected to the vehicle body and/or the engine and including:
a set of nested tubular walls,
a plurality of helical walls intersecting each of the nested tubular walls to form at least two first channel layers nested with at least two second channel layers, each first channel layer and each second channel layer defining a plurality of helical fluid channels,
a first intake and a first outtake in fluid communication with one another via the helical fluid channels of each first channel layer, for flow of intake air for the engine through the heat transfer device from the first intake to the first outtake, and
a second intake and a second outtake in fluid communication with one another via the plurality of helical fluid channels of each second channel layer, for flow of a second fluid through the heat transfer device from the second intake to the second outtake;
wherein the heat transfer device is configured to cool the flow of intake air and heat the flow of the second fluid.

2. The aerospace vehicle of claim 1, wherein the heat transfer device is configured to cool the intake air upstream of a fan or compressor stage of the engine.

3. The aerospace vehicle of claim 1, wherein the second fluid is supercritical carbon dioxide.

4. The aerospace vehicle of claim 3, wherein the heat transfer device is configured to heat the supercritical carbon dioxide for use as a working fluid in a thermodynamic cycle that converts heat to another form of energy.

5. The aerospace vehicle of claim 1, wherein the heat transfer device is in fluid communication with a turbine.

6. A method of transferring heat between fluids using a heat transfer device including a set of nested tubular walls intersected by a plurality of helical walls to form one or more first channel layers nested with one or more second channel layers, the method comprising:
passing a first fluid through the heat transfer device between a first intake and a first outtake via a plurality of helical fluid channels of each of the one or more first channel layers of the heat transfer device; and
passing a second fluid through the heat transfer device between a second intake and a second outtake via a plurality of helical fluid channels of each of the one or more second channel layers of the heat transfer device;
wherein each first channel layer is located between an adjacent pair of the tubular walls, and wherein each second channel layer is located between an adjacent pair of the tubular walls.

7. The method of claim 6, wherein passing the first fluid includes passing the first fluid through a plurality of helical fluid channels defined by each of at least two first channel layers of the device, and wherein passing the second fluid includes passing the second fluid through a plurality of helical fluid channels defined by each of at least two second channel layers of the device.

8. The method of claim 7, wherein passing the first and second fluids through the heat transfer device includes cooling the first fluid and heating the second fluid.

9. The method of claim 8, wherein the first fluid is intake air for a vehicle engine.

10. The method of claim 9, wherein the second fluid is supercritical carbon dioxide.

11. The method of claim 10, further including driving rotation of a turbine with the second fluid, after passing the second fluid through the heat transfer device.

12. The method of claim 11, further including compressing the second fluid with a compressor powered by the turbine, and then passing the second fluid through the heat transfer device again.

13. The aerospace vehicle of claim 1, wherein the heat transfer device further includes a flange projecting from a helical wall of the plurality of helical walls, or from a nested tubular wall of the set of nested tubular walls, and into a lumen of a helical fluid channel of the plurality of helical fluid channels of a first channel layer or a second channel layer.

14. The aerospace vehicle of claim 1, wherein the plurality of helical fluid channels of a first channel layer of the at least two first channel layers includes a pair of adjacent helical fluid channels having a pair of channel inlets and a pair of channel outlets, and wherein one of the helical walls defines an opening that provides fluid communication between the pair of adjacent helical fluid channels at a position intermediate the pair of channel inlets and the pair of channel outlets.

15. The aerospace vehicle of claim 1, wherein each helical wall of at least a subset of the plurality of helical walls projects into a lumen of an innermost nested tubular wall of the set of nested tubular walls.

16. The aerospace vehicle of claim 1, wherein the set of nested tubular walls defines a central axis, and wherein the first intake, the first outtake, the second intake, and the second outtake define respective axes that are coplanar with the central axis.

17. The aerospace vehicle of claim 1, wherein each first channel layer is located between an adjacent pair of the tubular walls, and wherein each second channel layer is located between an adjacent pair of the tubular walls.

18. The aerospace vehicle of claim 1, wherein each first channel layer is radially adjacent a second channel layer, and wherein each second channel layer is radially adjacent a first channel layer.

19. The aerospace vehicle of claim 1, wherein the helical walls of the plurality of helical walls are rotationally offset from one another about a central axis defined by the set of nested tubular walls.

20. The aerospace vehicle of claim 1, wherein the set of nested tubular walls defines a central axis, the first intake and the first outtake are on opposite sides of the device along the central axis, and the second intake and the second outtake are on opposite sides of the device along the central axis.

21. A vehicle comprising:
a vehicle body;
an engine connected to the vehicle body and configured to power the vehicle body; and a counterflow heat transfer device connected to the vehicle body and/or the engine and including:
a first helical flow path and a second helical flow path, each including a plurality of helical fluid channels,
wherein the helical fluid channels of both flow paths are formed by a plurality of helical walls intersecting a set of nested tubular walls, each of the plurality of helical walls extending radially outward, linearly, in a plane including a central axis of the device, and
wherein each helical wall of at least a subset of the plurality of helical walls projects into a lumen of an innermost nested tubular wall of the set of nested tubular walls.

* * * * *